(12) United States Patent
Sochi et al.

(10) Patent No.: US 9,311,575 B2
(45) Date of Patent: Apr. 12, 2016

(54) INFORMATION PROCESSING APPARATUS, INFORMATION PROCESSING METHOD, AND COMPUTER-READABLE STORAGE MEDIUM STORING PROGRAM, FOR GENERATING DRAWING DATA

(71) Applicants: Yoshinori Sochi, Tokyo (JP); Yosuke Aoki, Kanagawa (JP)

(72) Inventors: Yoshinori Sochi, Tokyo (JP); Yosuke Aoki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/657,880

(22) Filed: Mar. 13, 2015

(65) Prior Publication Data
US 2015/0262044 A1 Sep. 17, 2015

(30) Foreign Application Priority Data

Mar. 14, 2014 (JP) .................................. 2014-051845
Feb. 25, 2015 (JP) .................................. 2015-035825

(51) Int. Cl.
*G06K 15/02* (2006.01)
*G06F 3/12* (2006.01)
(52) U.S. Cl.
CPC .......... *G06K 15/1857* (2013.01); *G06F 3/1208* (2013.01); *G06F 3/1209* (2013.01); *G06F 3/1247* (2013.01); *G06F 3/1275* (2013.01); *G06F 3/1282* (2013.01); *G06K 15/1811* (2013.01); *G06K 15/1813* (2013.01)
(58) Field of Classification Search
CPC .................................................... G06K 15/1857
USPC ......................................................... 358/1.15
See application file for complete search history.

(56) References Cited

U.S. PATENT DOCUMENTS

2002/0060801 A1* 5/2002 Motamed ........... G06K 15/1857
358/1.13
2009/0279125 A1 11/2009 Liu et al.
2012/0287463 A1 11/2012 Iida

FOREIGN PATENT DOCUMENTS

| JP | 2009-271930 | 11/2009 |
| JP | 2012-238188 | 12/2012 |
| JP | 2013-088992 | 5/2013 |

* cited by examiner

*Primary Examiner* — Jacky X Zheng
(74) *Attorney, Agent, or Firm* — Duft Bornsen & Fettig LLP

(57) ABSTRACT

An information processing apparatus for generating drawing data by using a print job including setting information and print data. The information processing apparatus includes a plurality of drawing data generation units that generate drawing data; a selection unit that selects one of the plurality of drawing data generation units that is compliant with a print instruction for the print data; and a print job output unit that outputs the print job to the drawing data generation unit selected by the selection unit.

8 Claims, 32 Drawing Sheets

PRINT JOB FROM WORKFLOW APPLICATION OF COMPANY D
(EXPECTED OUTPUT RESULT)

PAGE 1  PAGE 2  PAGE 3

PRINT RESULT OF RENDERING BY RIP ENGINE OF COMPANY A

CHARACTER FONT USED ON PAGE 3 IS NOT SUPPORTED BY RIP ENGINE OF COMPANY A

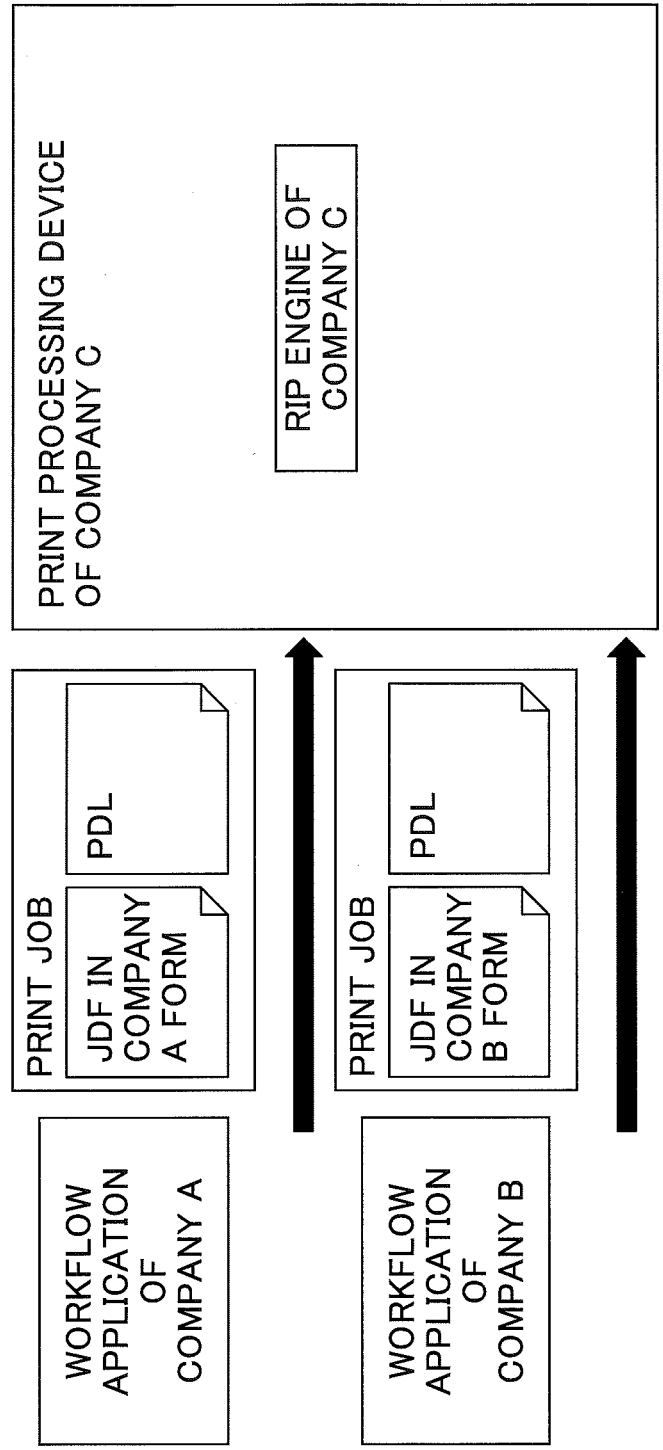

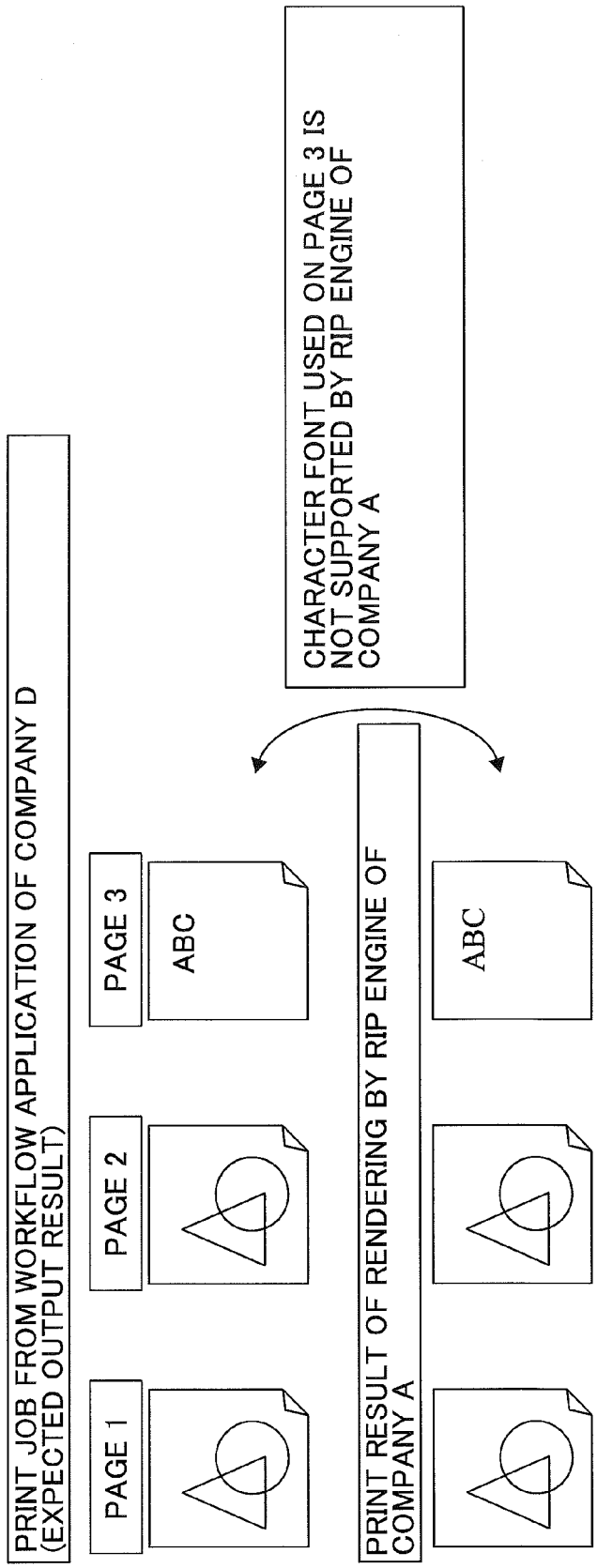

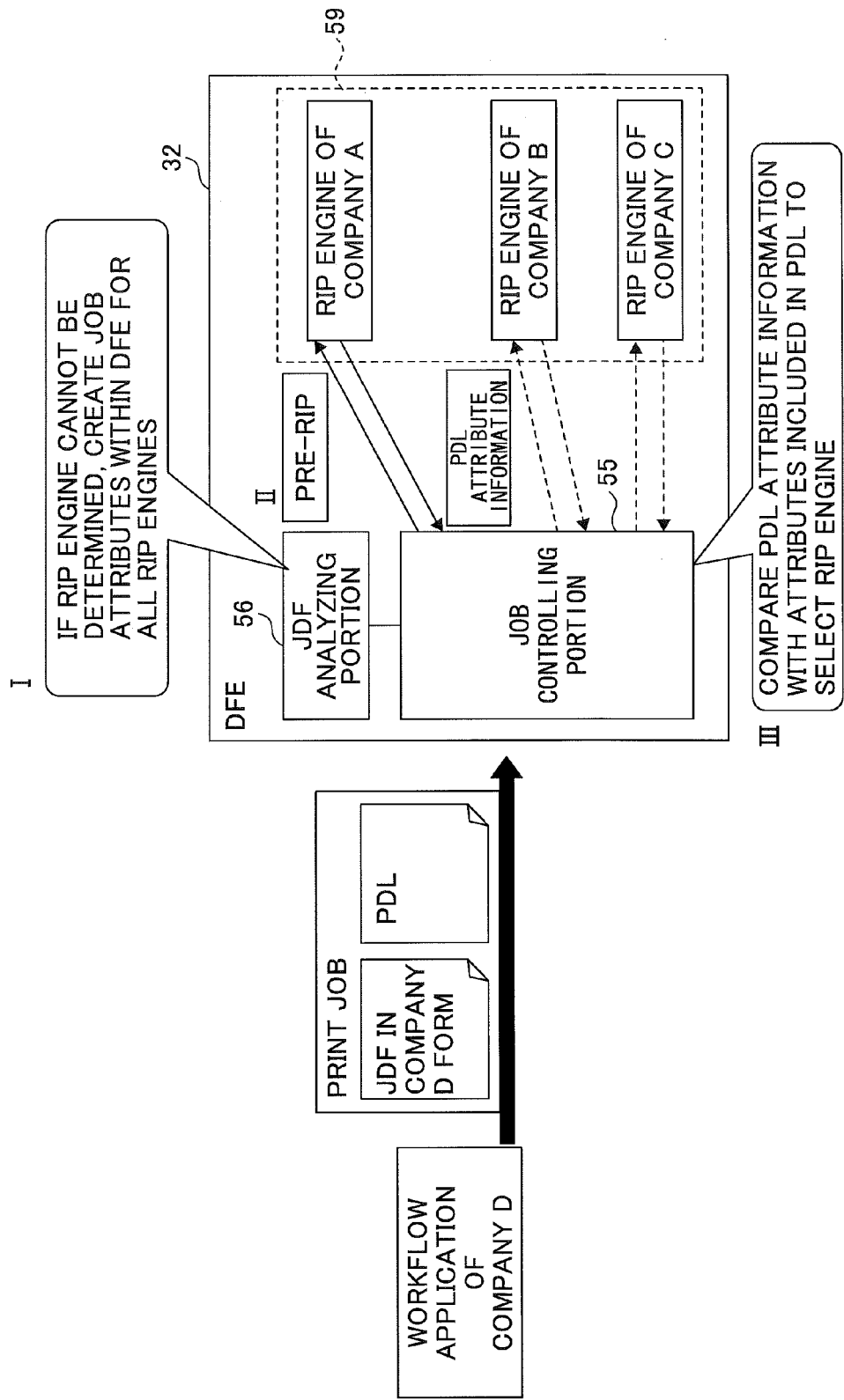

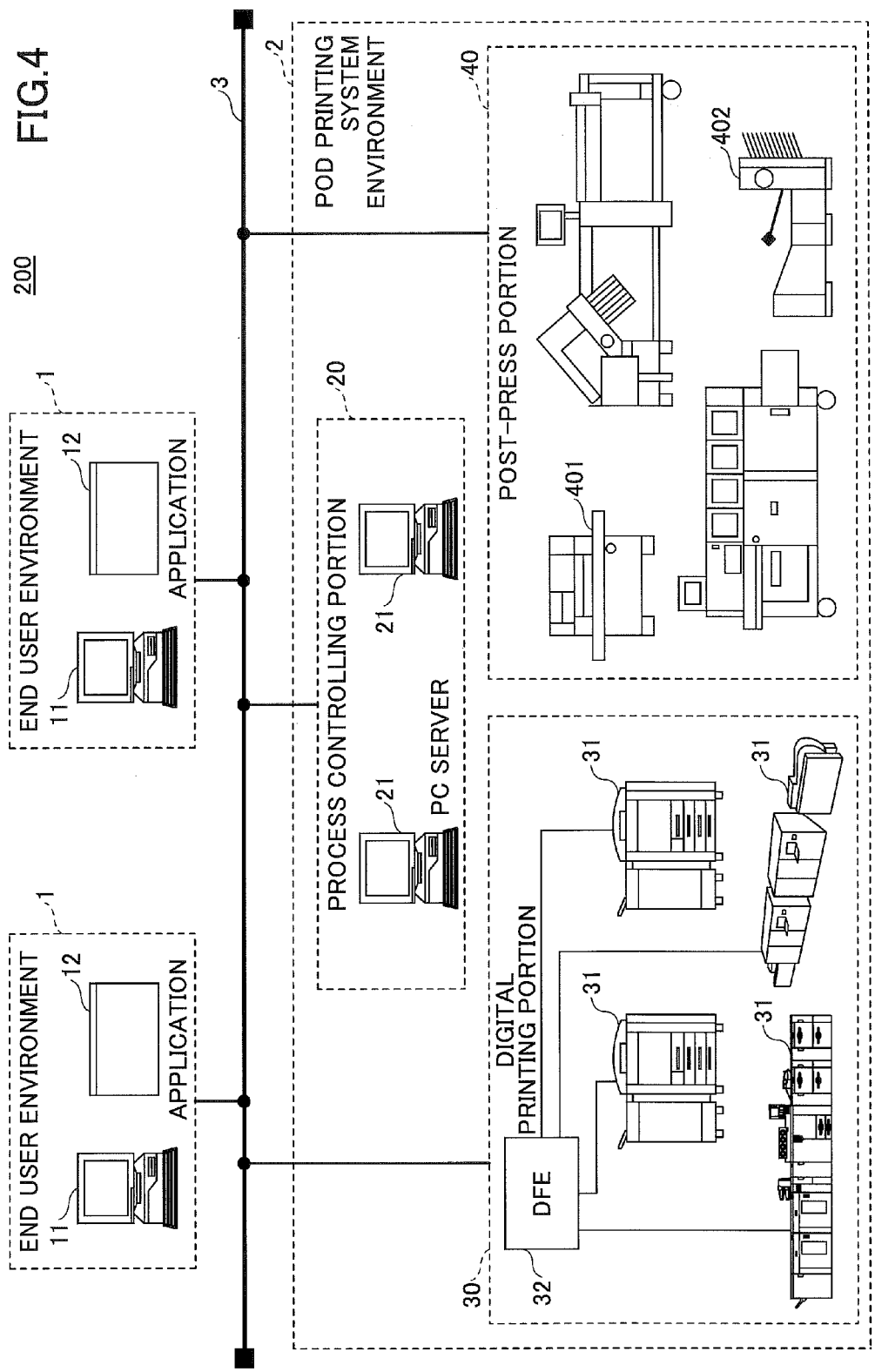

```
<JDFxmlns="http://www.CIP4.org/JDFSchema_1_1" xmlns:C="www.ccc.com/schema/ccc" ...>
  <ResourceLinkPool>
    <ComponentLink ... Amount = "2" ... />
    ...
  </ResourceLinkPool>
  <ResourcePool>
    <LayoutPreparationParams ... Rotate = "Rotate90" ... >
    ...
    </LayoutPreparationParams>
  </ResourcePool>
</JDF>
```

FIG.7A

```
<JDFxmlns="http://www.CIP4.org/JDFSchema_1_1" xmlns:A="www.aaa.com/schema/aaa" ...>
  <ResourceLinkPool>
    <ComponentLink ... Amount = "2" ... />
    ...
  </ResourceLinkPool>
  <ResourcePool>
    <LayoutPreparationParams ... A:Rotate = "2" ... >
    ...
    </LayoutPreparationParams>
  </ResourcePool>
</JDF>
```

FIG.7B

```
<JDFxmlns="http://www.CIP4.org/JDFSchema_1_1" xmlns:B="www.bbb.com/schema/bbb" ...>
  ...
  <ResourceLinkPool>
    <ComponentLink ... B:DeliveryAmount = "2" ... />
    ...
  </ResourceLinkPool>
  <ResourcePool>
    <LayoutPreparationParams ...   B:AlternateRotation = "false"   ....   B:Rotate = "1" >
    ...
    </LayoutPreparationParams>
  </ResourcePool>
  ...
</JDF>
```

| JDF OF COMPANY C | | JOB ATTRIBUTES WITHIN DFE | |
|---|---|---|---|
| ATTRIBUTE NAME | ATTRIBUTE VALUE | ITEM NAME | ITEM VALUE |
| Amount | 1-32767 | NUMBER OF COPIES | 1-32767 COPIES |
| Rotate | | ROTATION | |
| | Rotate0 | | 0° ROTATION |
| | Rotate90 | | 90° ROTATION |
| | Rotate180 | | 180° ROTATION |
| | Rotate270 | | 270° ROTATION |
| ... | ... | ... | ... |

FIG.8B

| JDF OF COMPANY A | | JOB ATTRIBUTES WITHIN DFE | |
|---|---|---|---|
| ATTRIBUTE NAME | ATTRIBUTE VALUE | ITEM NAME | ITEM VALUE |
| A:Amount | 1-32767 | NUMBER OF COPIES | 1-32767 COPIES |
| A:Rotate | 1 | ROTATION | 0° ROTATION |
| | 2 | | 90° ROTATION |
| | 3 | | 180° ROTATION |
| | 4 | | 270° ROTATION |
| ... | ... | ... | ... |

FIG.8C

| JDF OF COMPANY B | | JOB ATTRIBUTES WITHIN DFE | |
|---|---|---|---|
| ATTRIBUTE NAME | ATTRIBUTE VALUE | ITEM NAME | ITEM VALUE |
| B:DeliveryAmount | 1-32767 | NUMBER OF COPIES | 1-32767 COPIES |
| B:AlternateRotation | true | ROTATION | |
| | false | | |
| B:Rotate | 1 | | 0° ROTATION |
| | 2 | | 90° ROTATION |
| | 3 | | 180° ROTATION |
| | 4 | | 270° ROTATION |
| | ... | | ... |
| ... | ... | ... | ... |

FIG.10

| | ITEMS | |
|---|---|---|
| JOB INFORMATION | NUMBER OF COPIES | |
| | DIRECTION INFORMATION | |
| | PRINTING SURFACE INFORMATION | |
| | ROTATION | |
| | SCALING UP/DOWN | |
| EDIT INFORMATION | IMAGE POSITION | OFFSET |
| | | POSITIONAL ADJUSTMENT INFORMATION |
| | | CUSTOM IMPOSITION ARRANGEMENT |
| | LAYOUT INFORMATION | PAGE NUMBER |
| | | IMPOSITION INFORMATION |
| | | PAGE ORDER INFORMATION |
| | | CREEP POSITIONAL ADJUSTMENT |
| | MARGIN INFORMATION | |
| | CROP MARK INFORMATION | CENTER CROP MARK INFORMATION |
| | | CORNER CROP MARK INFORMATION |
| FINISHING INFORMATION | COLLATE INFORMATION | |
| | STAPLE/BIND INFORMATION | |
| | PUNCH INFORMATION | |
| | FOLDING INFORMATION | |
| | TRIMMING INFORMATION | |
| | OUTPUT TRAY INFORMATION | |
| | INPUT TRAY INFORMATION | |
| | COVER SHEET INFORMATION | |
| RIP CONTROL MODE (PAGE MODE OR SHEET MODE) | | |

FIG.11

| ITEMS | | |
|---|---|---|
| INPUT/OUTPUT DATA TYPE INFORMATION | | |
| READING/WRITING POSITION SPECIFYING METHOD INFORMATION FOR INPUT/OUTPUT DATA | | |
| READING/WRITING POSITION INFORMATION FOR INPUT/OUTPUT DATA | | |
| READING/WRITING EXECUTION MODE INFORMATION FOR INPUT/OUTPUT DATA | | |
| UNIT INFORMATION (DIMENSIONS) | | |
| COMPRESSION METHOD INFORMATION FOR INPUT/OUTPUT DATA | | |
| RIP CONTROL MODE | | |
| INPUT/ OUTPUT IMAGE INFORMATION PORTION | INFORMATION ABOUT OUTPUT IMAGE | IMAGE FORMAT TYPE |
| | | IMAGE FORMAT DIMENSIONS |
| | | IMAGE FORMAT RESOLUTION |
| | | IMAGE POSITION |
| | | COLOR SEPARATION INFORMATION |
| | | COLOR PLANE FIT POLICY INFORMATION |
| | | PLANE SHIFT INFORMATION |
| | | COLOR BIT NUMBER OF IMAGE FORMAT |
| | | IMAGE DIRECTION INFORMATION |
| | | IMAGE FORMATION POSITION INFORMATION |
| | | IMAGE FORMATION SIZE INFORMATION |
| | | IMAGE FORMATION METHOD INFORMATION |
| | | COLOR ICC INFORMATION |
| | | FONT SUBSTITUTION INFORMATION |
| | | IMAGE FORMATION ORIGIN INFORMATION |
| | | FLAT K BLACK INFORMATION |
| | | RENDERING INFORMATION |
| | INFORMATION ABOUT INPUT IMAGE | IMAGE FORMAT TYPE |
| | | IMAGE FORMAT DIMENSIONS |
| | | IMAGE FORMAT RESOLUTION |
| | | IMAGE POSITION |
| | | INPUT DATA |
| | | PAGE AREA INFORMATION |
| | | COLOR ICC INFORMATION |
| | INFORMATION ABOUT HANDLING OF IMAGE | SCALING OFFSET INFORMATION |
| | | OBJECT REGION INFORMATION |
| | | HALFTONE INFORMATION |
| | | SCALING ALGORITHM INFORMATION |
| INFORMATION ABOUT PDL | DATA AREA | |
| | SIZE INFORMATION | |
| | DATA ARRANGEMENT METHOD | |

FIG.12

| RIP ENGINE | ATTRIBUTE OF IMAGE | ATTRIBUTE OF CHARACTER FONT |
|---|---|---|
| COMPANY A | SUPERPOSITION PATTERN AA IS INSTALLED<br>SUPERPOSITION PATTERN BB IS INSTALLED | CHARACTER FONT A IS INSTALLED<br>CHARACTER FONT B IS INSTALLED |
| COMPANY B | SUPERPOSITION PATTERN AA IS INSTALLED<br>SUPERPOSITION PATTERN BB IS INSTALLED<br>SUPERPOSITION PATTERN CC IS INSTALLED | CHARACTER FONT B IS INSTALLED |
| COMPANY C | SUPERPOSITION PATTERN AA IS INSTALLED | SPECIAL FONT M IS INSTALLED |

INFORMATION PROCESSING APPARATUS, INFORMATION PROCESSING METHOD, AND COMPUTER-READABLE STORAGE MEDIUM STORING PROGRAM, FOR GENERATING DRAWING DATA

CROSS-REFERENCE TO RELATED APPLICATIONS

The present application claims priority to and incorporates by reference the entire contents of Japanese Patent Application No. 2014-051845 filed in Japan on Mar. 14, 2014 and Japanese Patent Application No. 2015-035825 filed in Japan on Feb. 25, 2015.

BACKGROUND OF THE INVENTION

1. Field of the Invention

The present invention relates to an information processing apparatus and the like that use a print job including setting information and print data and generate drawing data.

2. Description of the Related Art

There is what is called "production printing" for printing and binding a huge amount of commercial documents (see Patent Document 1, for example). Patent Document 1 discloses a printing system capable of notifying a user of whether a post process is available in consideration of an entire portion of the printing system.

In production printing, a printing process is often handled as a workflow. There is a trend of opening printing workflows. Through opening, it is possible for software (a workflow application described below) and printing devices of various companies to describe setting of print jobs in a main process of printing in a common description method. A standard format called "Job Definition Format" (JDF) is known as a format for describing an entire portion of the printing workflow.

The printing workflow has various types of processes such as creation of a document or contents, specification of a printing method, printing, and post processing. Although each process is performed by various workflow applications and printing devices, the JDF enables cooperation between the printing devices, printing process management, and the like irrespective of difference of the workflow applications and difference of manufacturers of the printing devices.

However, each workflow application or printing device may extend the JDF. In this case, the JDF created by the workflow application of a company may include a description specific to the workflow application.

FIG. 1A is an example of a diagram illustrating a problem when a print processing device of company C receives a print job. It is noted that FIG. 1A is a comparative example rather than related art. The print processing device of company C receives a print job from workflow applications of companies A and B. Since each workflow application extended each JDF, this may lead to a situation where the print processing device of company C cannot analyze or process the extended JDF.

In order to handle a print job of each workflow application, the printing processing of company C may have a rendering engine (hereafter an "RIP engine") installed, which supports conversion of JDF and each workflow application. In FIG. 1B, a JDF analyzing portion 56 analyzes the JDF to identify a manufacturer of a workflow application that created the JDF and converts the JDF into setting information that can be handled by the print processing device of company C. Further, by having RIP engines that support each workflow application, it is possible to print a print job created by each workflow application with finishing as expected by a user.

However, since there are various manufacturers of workflow applications, print jobs that are assumed to be rendered by the RIP engine included in the print processing device of company C are not always input.

FIG. 2A is an example of a diagram illustrating a problem when a print job for an RIP engine that is not included in the print processing device of company C is input. In this example, company D is assumed to be a manufacturer of a workflow application other than companies A to C. The workflow application of company D inputs a print job to the print processing device of company C.

Even if the JDF analyzing portion 56 analyzes a JDF of the print job created by the workflow application of company D, the JDF analyzing portion 56 cannot identify company D. Accordingly, the JDF analyzing portion 56 converts the JDF into setting information for an RIP engine of company A. In this case, it is assumed that because the JDF created by the workflow application of company D is not substantially different from a JDF created by a workflow application of company A, the JDF created by the workflow application of company D is converted into setting information appropriate for the RIP engine of company A.

However, even if the JDF created by the workflow application of company D is converted into setting information that can be handled by the RIP engine of company A, an output result may be different. In other words, the JDF and Page Description Language (PDL) are input as a print job from the workflow application to the print processing device of company C. In accordance with this, even if the JDF is correctly converted, it may not be possible to obtain an output result expected by a user depending on an attribute set in the PDL of company D.

FIG. 2B is a diagram showing an example of a case where an output result expected by the user cannot be obtained. An upper portion of FIG. 2B shows an output result expected by the user, namely, an output result if an RIP engine of company D performs rendering, for example. A lower portion of FIG. 2B shows an output result if an RIP engine of company A performs rendering.

In each output result, raster data for three pages is output from a print job of company D. While the same output results are obtained on page 1 and page 2, output results (fonts) are different on page 3.

This is because font information set in the PDL of page 3 by the workflow application of company D is not supported by the RIP engine of company A.

In this manner, depending on an attribute set in a PDL, an output result expected by the user may not be obtained by merely converting a JDF appropriately. Further, even if an output result expected by the user can be obtained by using one of RIP engines because the JDF is appropriately converted and the print processing device of company C includes a plurality of RIP engines, there is another problem in that a mechanism for selecting a suitable RIP engine has not been prepared.

[Patent Document 1] Japanese Laid-Open Patent Application No. 2012-238188

SUMMARY OF THE INVENTION

In view of the above-mentioned problems, it is a general object of at least one embodiment of the present invention to provide an information processing apparatus for outputting an appropriate output result from a print job.

In an embodiment, an information processing apparatus for generating drawing data by using a print job including setting information and print data is provided. The information processing apparatus includes a plurality of drawing data generation units that generate drawing data; a selection unit that selects one of the plurality of drawing data generation units that is compliant with a print instruction for the print data; and a print job output unit that outputs the print job to the drawing data generation unit selected by the selection unit.

According to an embodiment of the present invention, it is possible to provide an information processing apparatus for outputting an appropriate output result from a print job.

BRIEF DESCRIPTION OF THE DRAWINGS

Other objects and further features of embodiments will become apparent from the following detailed description when read in conjunction with the accompanying drawings, in which:

FIG. 1A is an example of a diagram illustrating a problem when a print processing device of company C receives a print job;

FIG. 2B is a diagram showing an example of a case where an output result expected by a user cannot be obtained;

FIG. 3 is an example of a diagram schematically illustrating features of a DFE;

FIG. 4 is an example of a diagram showing an entire configuration of a printing system;

FIG. 7A is an example of a diagram illustrating a part of a JDF description;

FIG. 7B is an example of a diagram illustrating a part of a JDF description;

FIG. 7C is an example of a diagram illustrating a part of a JDF description;

FIG. 8A is a diagram showing an example of a conversion table;

FIG. 8B is a diagram showing an example of a conversion table;

FIG. 8C is a diagram showing an example of a conversion table;

FIG. 10 is a diagram showing an example of "job attributes within DFE";

FIG. 11 is a diagram showing an example of an "RIP Parameter List";

FIG. 12 is an example of a diagram showing an attribute and an attribute value supported by an RIP engine of each company;

DESCRIPTION OF THE PREFERRED EMBODIMENTS

Figure 1B:
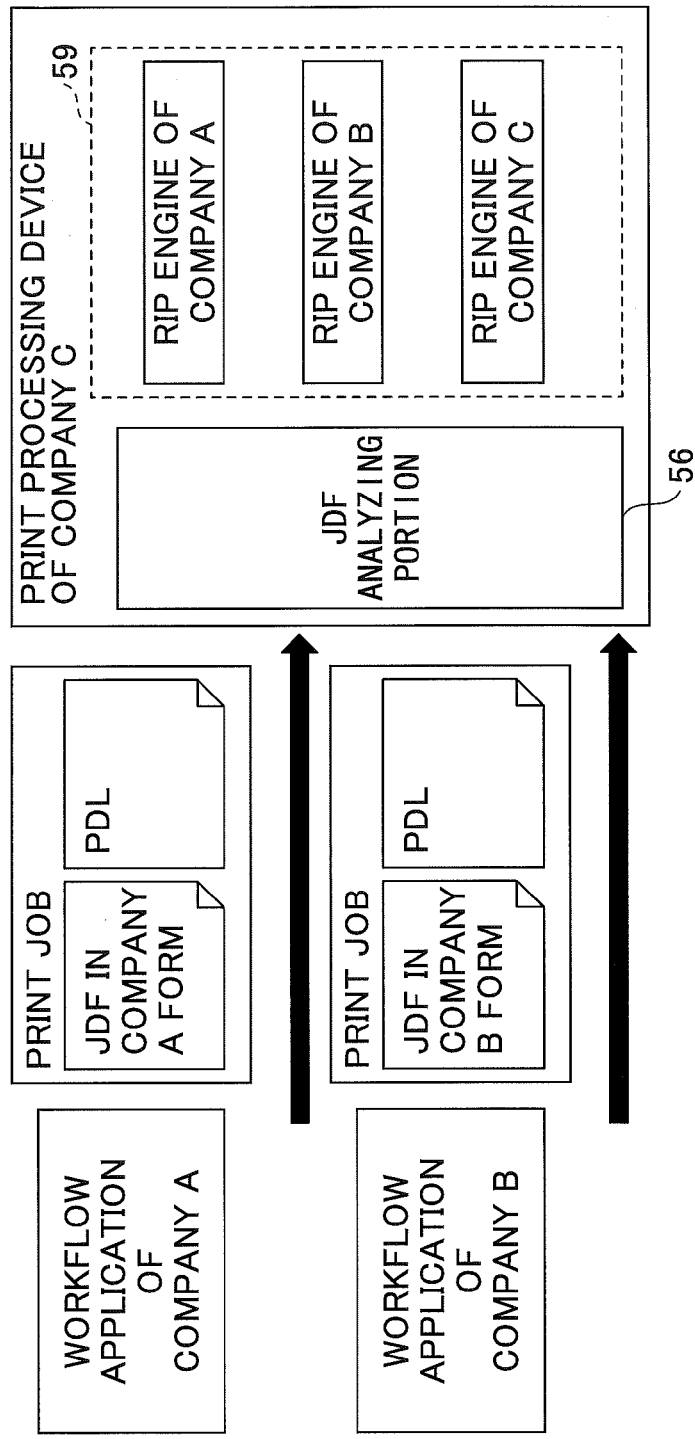
FIG. 1B is an example of a diagram illustrating that a JDF analyzing portion 56 analyzes a JDF to identify a manufacturer of a workflow application and converts the JDF into setting information.
Figure 2A:
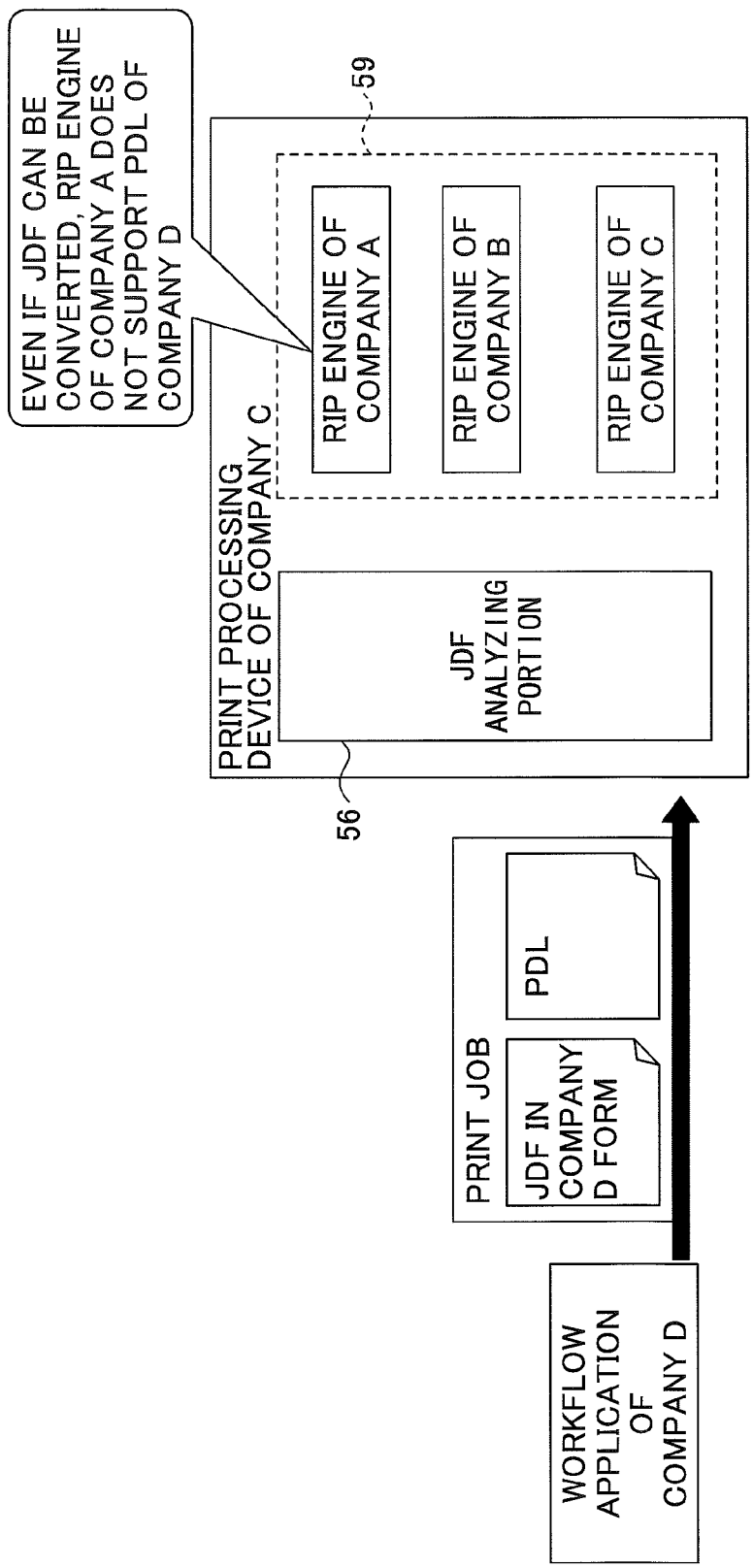
FIG. 2A is an example of a diagram illustrating a problem when a print job for an RIP engine that is not included in a print processing device of company C is input.

In the following, embodiments of the present invention will be described with reference to the accompanying drawings.

Embodiment 1

FIG. 3 is an example of a diagram schematically illustrating features of a DFE according to an embodiment. A Digital Front End (DFE) 32 of company C corresponds to a print processing device. The DFE 32 of company C includes RIP engines 59 of companies A to C.

Each RIP engine is suitable for rendering (drawing processing) a print job created for the RIP engine. Accordingly, it is assumed that a print job created by a workflow application of company A is rendered by an RIP engine of company A, a print job created by a workflow application of company B is rendered by an RIP engine of company B, and a print job created by a workflow application of company C is rendered by an RIP engine of company C. In addition, a workflow application and an RIP engine 59 of a so-and-so company are not limited to a case where the so-and-so company actually made the workflow application and the RIP engine 59 but include a case where the workflow application and the RIP engine 59 are made "for the so-and-so company".

Even if a JDF is extended, as long as a print job is created by a workflow application of company A, B, or C, the DFE 32 can convert the extended JDF into "job attributes within DFE" that are suitable for the RIP engine 59 by determining which RIP engine 59 is assumed to render the print job.

By contrast, if a print job created by a workflow application of company D is input to the DFE 32, the DFE 32 cannot identify the RIP engine 59. In view of this, the DFE 32 of the present embodiment operates as follows.

I. If the RIP engine 59 cannot be identified, the JDF analyzing portion 56 creates "job attributes within DFE" for all the RIP engines. The "job attributes within DFE" are setting information that can be handled by a print processing device of company C.

II. A job controlling portion 55 performs pre-RIP (a process to obtain PDL attribute information included in a PDL from each RIP engine 59). In accordance with this, among attributes set in the PDL of company D, attribute values supported by each RIP engine 59 and its range are determined.

III. The job controlling portion 55 compares the PDL attribute information with attributes included in the PDL of a print job of company D to determine an RIP engine 59 suitable for the print job of company D.

In this manner, even if a print job assumed to be processed by an RIP engine 59 that is not included in the DFE 32 of company C is input, it is possible to select a suitable RIP engine 59 by obtaining the PDL attribute information in the pre-RIP. It is possible to obtain an output result (print result) expected by a user by performing printing using this RIP engine 59.

Configuration Example

FIG. 4 is an example of a diagram showing an entire configuration of a printing system 200 according to the present embodiment. The printing system 200 according to the present embodiment includes at least one end user environment 1 and a Print On Demand (POD) printing system environment 2 connected via a network 3 such as a LAN or the Internet.

In the end user environment 1, a client Personal Computer (PC) 11 is disposed. A workflow application for POD printing operation (hereafter simply referred to as "application") 12 is installed on the client PC 11, so that the client PC 11 is capable of creating a print job when a user operation is received.

The application 12 can perform an aggregate printing function (Number Up impose function) to attach a plurality of logical page images to a sheet surface and an image editing function to add a header, a footer, a page number, and the like. Further, the application 12 can specify a perforation (punch) instruction for bookbinding and an instruction such as a staple fixation (staple) instruction. These instructions or settings are described in a JDF. The JDF is also referred to as a "job ticket", an "operation instruction", a "printing instruction", and the like.

The POD printing system environment 2 includes a process controlling portion 20, a digital printing portion 30, and a post-press portion 40 connected via the network 3. In the POD printing system environment 2, the process controlling portion 20 sends an instruction to perform an operation to each of the digital printing portion 30 and the post-press portion 40 and manages workflows of the POD printing system environment 2 in an integrated manner.

The process controlling portion 20 receives a print job (JDF and PDL) from the end user environment 1 and stores the print job. The JDF is an example of "setting information" in the Claims and the PDL is an example of "print data" in the Claims. While the PDL is a language for specifying drawing contents of a page image (rasterized image), the PDL here means data described in the PDL. Examples of the PDL include Portable Document Format (PDF), PostScript, PCL, RPDL, and the like.

The process controlling portion 20 also assembles operations in each process as a workflow based on a print job from the end user environment 1 and efficiently schedules operations of the digital printing portion 30, the post-press portion 40, and an operator. When an error occurs in an automatic operation, the process controlling portion 20 can notify the operator where necessary. In general, the process controlling portion 20 is configured to include at least one PC server 21.

The process controlling portion 20 transmits a print job to the digital printing portion 30 to cause the digital printing portion 30 to perform printing. Further, printed matter is conveyed to the post-press portion 40 and the post-press portion 40 performs bookbinding, for example, by an instruction from the process controlling portion 20. The print job may be transmitted to the post-press portion 40 directly from the digital printing portion 30.

The digital printing portion 30 is configured to include various types of printers 31 (printer devices such as a printer for production, a high-speed color inkjet printer, and a color/monochrome MFP). In the digital printing portion 30, a DFE 32 is disposed. The DFE 32 is also referred to as a "print processing device" or a "printer controlling device" and controls printing by the printers 31. The DFE 32 may be separate from the printers 31 as shown in the drawing or may be integrated with any of the printers 31. When the DFE 32 obtains a print job from the process controlling portion 20, the DFE 32 uses a JDF and a PDL to generate raster data (an example of "drawing data" in the Claims) by which the printer 31 forms an image using toner or ink, and the DFE 32 transmits the raster data to the printer 31.

The digital printing portion 30 includes various types of printers 31. The digital printing portion 30 may include the printer 31 directly connected to a finisher (post-processing device) for performing post processing such as folding, saddle stitching bookbinding, case binding, punching, and the like on printed recording paper.

The post-press portion 40 is configured to include post-processing devices such as a folder, a saddle stitching bookbinder, a case binder, a cutter, an inserter, a collator, and the like in accordance with an operation instruction of printed matter (post-press job) received from the process controlling portion 20. The post-press portion 40 performs finishing processing such as folding, saddle stitching bookbinding, case binding, cutting, inserting, collating, and the like on printed matter output from the digital printing portion 30. The post-press portion 40 includes post-processing devices for performing post processing after digital printing such as a stapler 401, a puncher 402, and the like.

An end user in the end user environment 1 uses the application 12 for POD printing operations from the client PC 11 to cause image editing, imposition, text insertion, post processing, and the like to be performed and transmits a print job to the process controlling portion 20 in the POD printing system environment 2.

In accordance with a JDF, the PC server 21 of the process controlling portion 20 instructs the digital printing portion 30 to perform printing and instructs the post-press portion 40 to perform a post process.

(Hardware Configuration)

In the present embodiment, a print job created in the end user environment 1 is received by the process controlling portion 20 and the process controlling portion 20 transmits the print job to the DFE 32. Functions of the DFE 32 of the present embodiment may not be necessarily performed by the DFE 32 if a device on a network performs the functions. In the present embodiment, it is assumed that the DFE 32 performs pre-RIP and selects an RIP engine.

Figure 5:
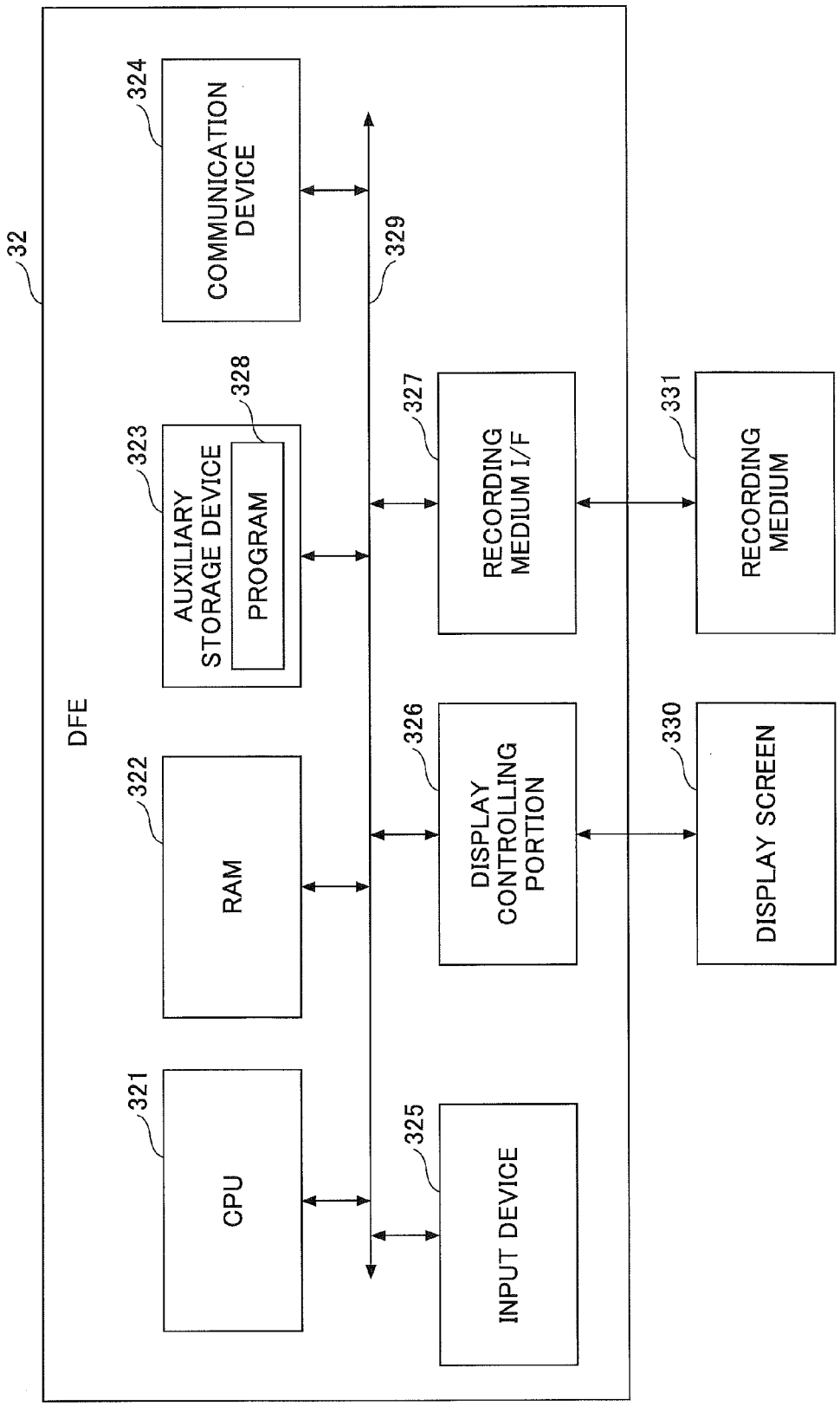
FIG. 5 is an example of a hardware configuration diagram of a DFE.

FIG. 5 is an example of a hardware configuration diagram of the DFE 32. The DFE 32 is realized by a hardware configuration as shown in FIG. 5, for example. In other words, the DFE 32 has a function of an information processing device (computer). The DFE 32 includes a CPU 321, a RAM 322, an auxiliary storage device 323, a communication device 324, an input device 325, a display controlling portion 326, and a recording medium I/F 327 interconnected via a bus 329.

The CPU 321 controls the entire hardware portion of the DFE 32 by executing a program with the RAM 322 functioning as working memory. The auxiliary storage device 323 is a non-volatile memory such as a Hard Disk Drive (HDD) or a Solid State Drive (SSD). The auxiliary storage device 323 stores a program 328 that has a function related to converting a print job.

The communication device 324 is a modem, a LAN card, or the like and is connected to the network 3 to communicate with the end user environment 1, the process controlling portion 20, or the post-press portion 40. The communication device 324 also communicates with the printers 31. The input device 325 is a keyboard or a mouse, for example, and accepts a user operation. The display controlling portion 326 is connected to a display screen 330 and performs rendering on the display screen 330 by an instruction from the CPU 321. The display screen 330 may include a touch panel.

A portable recording medium can be attached to or removed from the recording medium I/F 327. The recording medium I/F 327 writes data in a recording medium 331 by an instruction from the CPU 321 or reads out data from the recording medium 331. The recording medium 331 may be one of various types including a medium for optical, electric, or magnetic recording such as a CD-ROM, an optical disk, a USB memory, and an SD card and a semiconductor memory for electrically recording information such as a flash memory.

The program 328 is stored in the recording medium 331 and delivered or the program 328 is downloaded from a server (not shown) via the network 3.

Hardware configurations of the client PC 11 in the end user environment 1 and the PC server 21 in the process controlling portion 20 can be realized by the same configuration as in FIG. 5.

(Functions of DFE)

Figure 6:
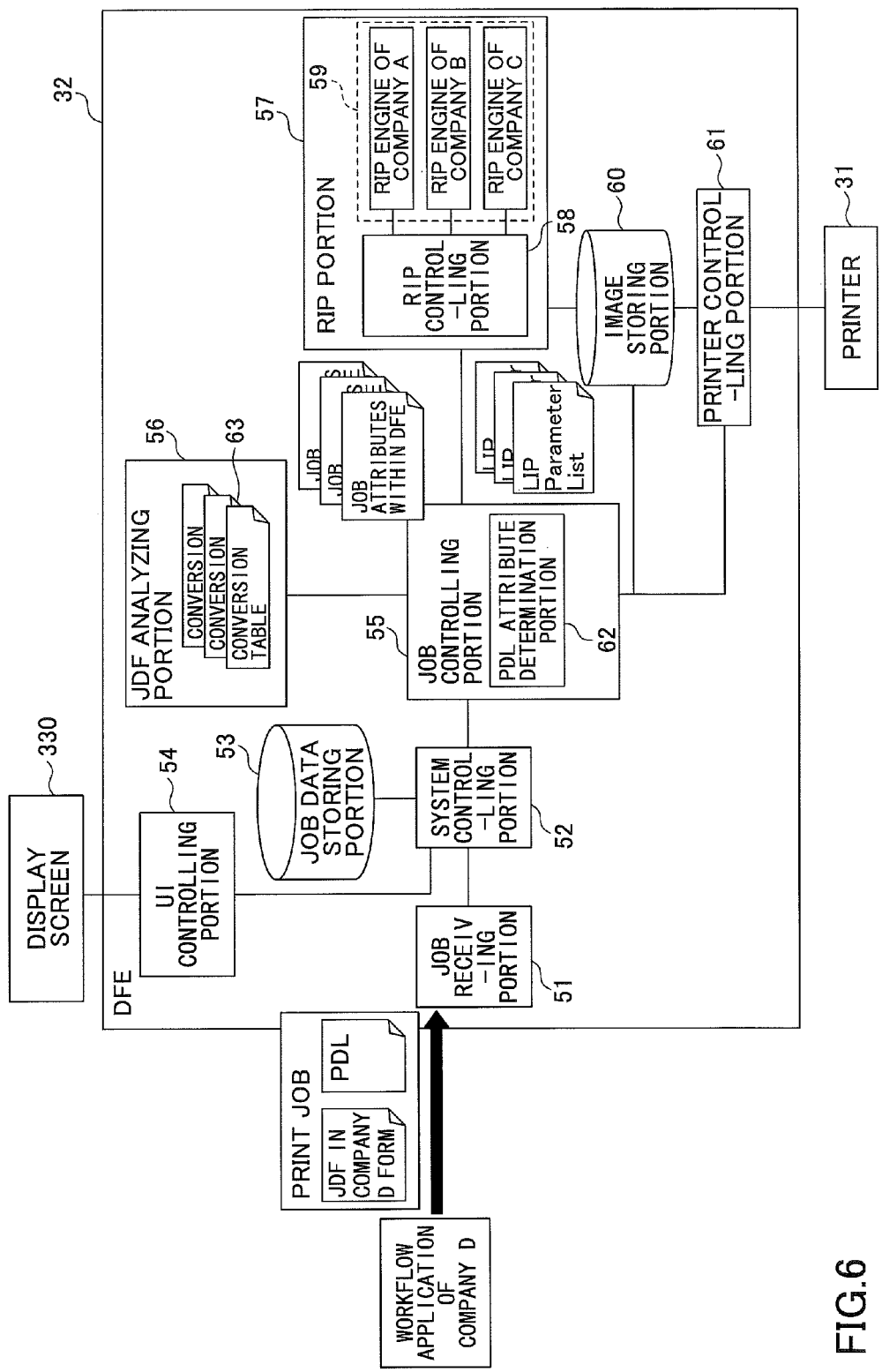
FIG. 6 is an example of a functional block diagram of a DFE.

FIG. 6 is an example of a functional block diagram of the DFE 32. The DFE 32 performs job control, Raster Image Processor (RIP) control, and printer control in a printing workflow. In this manner, the DFE 32 operates as a server to provide the end user environment 1 or the process controlling portion 20 with a main function of printing. The job control refers to control on a series of procedures of a print job such as receiving the print job, analyzing a JDF, creating raster data, printing by a printer, and the like. The RIP control refers to control to create an "RIP Parameter List" and cause an RIP engine 59 to create raster data after "job attributes within DFE" described below are created. The "RIP" is an acronym of "Raster Image Processor" and refers to a dedicated IC for generating raster data and to generation of raster data. The printer control refers to control to transmit the raster data and a part of the "job attributes within DFE" ("Finishing information" described below) to the printer and to cause the printer to perform printing.

The DFE 32 includes a job receiving portion 51, a system controlling portion 52, a UI controlling portion 54, a job controlling portion 55, a JDF analyzing portion 56, an RIP portion 57, an RIP controlling portion 58, the RIP engine 59, and a printer controlling portion 61. These are implemented when the CPU 321 executes the program 328 and cooperates with various types of hardware including those shown in FIG. 5. The DFE 32 further includes a job data storing portion 53 and an image storing portion 60 configured in the auxiliary storage device 323, the RAM 322, the recording medium 331, or the like.

The job receiving portion 51 receives, via the network 3, a print job from the application 12 or the like. The job receiving portion 51 associates the print job with a unique job number, a reception date and time, an end date and time, a status, and the like and stores them in a log, for example. Other than being input from the application 12, the print job may be input from a USB memory or the like. In the present embodiment, a JDF is assumed to be included in the print job. If the JDF is not included, the job receiving portion 51 creates a dummy JDF in order to enable rendering.

The system controlling portion 52 stores the received print job in the job data storing portion 53 or outputs the received print job to the job controlling portion 55. For example, if the DFE 32 is set in advance so that a print job is stored in the job data storing portion 53, the system controlling portion 52 stores the print job in the job data storing portion 53. Further, the JDF may describe whether to store a print job in the job data storing portion 53.

If a user operates such that contents of the print job stored in the job data storing portion 53 are displayed on the display screen 330, for example, the system controlling portion 52 outputs the JDF from the job data storing portion 53 to the UI controlling portion 54. If the user changes the JDF, the UI controlling portion 54 receives changed contents and the system controlling portion 52 stores the changed JDF in the job data storing portion 53 anew.

If the system controlling portion 52 receives an instruction to perform the print job from the user, the end user environment 1, or the process controlling portion 20, the system controlling portion 52 outputs the print job stored in the job data storing portion 53 to the job controlling portion 55. Further, if a printing time is set in the JDF, the system controlling portion 52 outputs the print job stored in the job data storing portion 53 to the job controlling portion 55 at the printing time.

The job data storing portion 53 is a storage area for storing a print job in this manner and is disposed in the auxiliary storage device 323 of the DFE 32 or the recording medium 331. The job data storing portion 53 may be disposed in a storage device (not shown) on a network.

The UI controlling portion 54 interprets a JDF and displays contents of a print job on the display screen 330. The UI controlling portion 54 also displays raster data generated by the RIP engine 59 on the display screen 330.

The job controlling portion 55 causes the RIP controlling portion 58 to generate raster data and causes the printer controlling portion 61 to perform printing. Specifically, the job controlling portion 55 first transmits the JDF of the print job to the JDF analyzing portion 56 and outputs a JDF conversion request to the JDF analyzing portion 56.

The JDF analyzing portion 56 of the present embodiment determines that the DFE 32 has the RIP engine 59 assumed to render a print job created by the application or determines that the DFE 32 does not have such an RIP engine 59. The following describes the former case where the JDF analyzing portion 56 determines that the DFE 32 has the RIP engine 59. In the present embodiment, the DFE 32 is assumed to include RIP engines 59 of companies A, B, and C.

The JDF analyzing portion 56 obtains the JDF and the JDF conversion request from the job controlling portion 55. The JDF analyzing portion 56 analyzes a description of the JDF to identify a manufacturer of the application 12 that created the JDF. The identification of the manufacturer of the application 12 that created the JDF means substantially the same as determination of an RIP engine 59 assumed to render the print job.

If the DFE 32 has the RIP engine 59 assumed to render a print job created by the application, the JDF analyzing portion 56 converts the JDF into "job attributes within DFE" using a conversion table 63 prepared for the manufacturer of the application 12. In other words, if the DFE 32 is created by company C, the JDF analyzing portion 56 coverts the JDF created by company A or B as well as by company C into "job attributes within DFE" that can be handled by the DFE 32 of company C.

If the DFE 32 does not have the RIP engine 59 assumed to render a print job created by the application, the JDF analyzing portion 56 creates "job attributes within DFE" using a conversion table 63 for company A, a conversion table 63 for company B and a conversion table 63 for company C. In other words, three sets of "job attributes within DFE" are created because the DFE 32 does not have an RIP engine of company D.

When the JDF analyzing portion 56 creates the "job attributes within DFE", the JDF analyzing portion 56 sets a "RIP control mode" in the "job attributes within DFE". While the "RIP control mode" is described below, the "RIP control mode" has a "Page Mode" and a "Sheet Mode". Whether a print job of each company is created in the "Page Mode" or the "Sheet Mode" has been examined in advance. Accordingly, if the manufacturer of the application 12 that created the JDF is identified, the "RIP control mode" can be determined too. In the present embodiment, it is assumed that the DFE 32 handles setting of aggregate printing of a print job in the "Page Mode" (by default).

The job controlling portion 55 obtains the "job attributes within DFE" in accordance with this, converts the "job attributes within DFE" and a PDL into an "RIP Parameter List" and outputs the print job as the "RIP Parameter List" to the RIP controlling portion 58. The "RIP Parameter List" is a collection of information necessary to perform an RIP process by the RIP engine 59. From the information in the "RIP Parameter List", the job controlling portion 55 determines an instruction of the RIP process to the RIP engine 59. This instruction is referred to as an RIP command.

If one set of "job attributes within DFE" is created (if the JDF analyzing portion 56 can identify the RIP engine 59), one "RIP Parameter List" is created by the job controlling portion 55.

By contrast, if three sets of "job attributes within DFE" are created (if the JDF analyzing portion 56 cannot identify the RIP engine 59), a suitable RIP engine is selected on each page and an "RIP Parameter List" is created on each page using one of the three sets of "job attributes within DFE" for the selected RIP engine.

In order to select the suitable RIP engine, the job controlling portion 55 includes a PDL attribute determination portion 62. The PDL attribute determination portion 62 performs pre-RIP in order to output a PDL to the RIP controlling portion 58 and obtain PDL attribute information. Further, based on the obtained PDL attribute information, the PDL attribute determination portion 62 determines whether it is possible to perform rendering by each RIP engine (an RIP engine suitable for each page). The pre-RIP will be described later.

The "RIP Parameter List" includes the "RIP control mode". The RIP controlling portion 58 controls the RIP engine 59 in accordance with the "RIP control mode". Accordingly, a sequence is determined by the "RIP control mode".

The "Page Mode" causes RIP processing for each page and generates raster data aggregated in a single sheet.

The "Sheet Mode" causes RIP processing for each part (corresponding to each page part before being aggregated) of a single sheet in which a plurality of pages have been aggregated and generates raster data.

The RIP portion 57 includes the RIP controlling portion 58 and the RIP engine 59 and generates raster data using the RIP controlling portion 58 and the RIP engine 59. The RIP controlling portion 58 analyzes information in the "RIP Parameter List" and determines an RIP engine 59 to be used from a plurality of RIP engines 59. The determination of the RIP engine 59 is based on at least one item in the "RIP Parameter List" or based on RIP engine identification information listed in the "RIP Parameter List". Further, if the RIP engine identification information is listed in the "RIP Parameter List", the job controlling portion 55, for example, selects an RIP engine 59 indicated by the RIP engine identification information. The RIP controlling portion 58 refers to the "RIP Parameter List" and transmits an RIP command to the selected RIP engine 59.

The RIP controlling portion 58 refers to the "RIP Parameter List", if the "RIP control mode" is the "Sheet Mode", the RIP controlling portion 58 outputs an RIP command to the RIP engine 59 in accordance with the "Sheet Mode". In accordance with this, it is possible to eliminate a difference of print jobs.

The RIP engine 59 is a rendering engine and generates raster data by performing rasterization in accordance with the RIP command.

The image storing portion 60 is a storage unit that stores generated raster data. The image storing portion 60 is installed in the auxiliary storage device 323, for example. The image storing portion 60 may be disposed on a storage device on a network.

The printer controlling portion 61 is connected to the printer 31. The printer controlling portion 61 performs printing by reading out the raster data stored in the image storing portion 60 and transmitting the raster data to the printer 31. The printer controlling portion 61 also performs a finishing process on the basis of the "Finishing information" obtained from the job controlling portion 55.

The printer controlling portion 61 communicates with the printer 31 using various types of communication standards and can obtain printer information. For example, CIP4 that has developed standards of printing workflows defines "DevCaps" as a JDF standard by which device specification information is sent to or received from a printer. Further, a method for collecting printer information using a communication protocol called "Simple Network Management Protocol" (SNMP) and a database called "Management Information Base" (MIB) is well known. (JDF and determination of manufacturer of application that created JDF)

A JDF is described in Extensible Markup Language (XML). The XML is a standard of structured text for providing a meaning to tags and structuring a document.

FIGS. 7A-C are examples of a diagram illustrating a part of a JDF description. It is assumed that a JDF in FIG. 7A is created by an application 12 of company C. The JDF describes contents of an instruction for a print job.

"JDF xmlns="http://www.CIP4.org/JDFSchema_1_1"" indicates a JDF ticket compliant with CIP4.

"xmlns:C="www.ccc.com/schema/ccc"" indicates a JDF tag definition independently extended by each printing company or vendor which is not compliant with CIP 4. In this example, any tag starting with "C:" within a JDF is an extended tag.

"ResourcePool" defines a collection of attributes to realize printing.

"LayoutPreparationParams" is one of attributes defined in the "ResourcePool" and defines attributes related to imposition.

"ResourceLinkPool" defines a collection of references to attributes commonly used within the "ResourcePool" for specific ranges if attributes are different in the ranges within a job such as pages.

"ComponentLink" is one of definitions of references within the "ResourceLinkPool" and specifies a reference of an attribute related to an output product and information.

"Amount" specifies a number of copies.

"Rotate" specifies a rotation angle for an image.

FIG. 7B is an example of expansion by company A and FIG. 7C is an example of expansion by company B. In FIG. 7B, "xmlns:A="www.aaa.com/schema/aaa"" indicates that any tag starting with "A:" within the JDF is an extended tag of company A. In FIG. 7C, "xmlns:B="www.bbb.com/schema/bbb"" indicates that any tag starting with "B:" within the JDF is an extended tag of company B.

Accordingly, the JDF analyzing portion 56 can identify a manufacturer of the application 12 that created the JDF by referring to these descriptions of the JDF. It is possible to use the conversion table 63 mentioned below depending on the manufacturer of the application 12 to convert the JDF into "job attributes within DFE" that can be handled by the DFE 32 of company C.

(Creation of Job Attributes within DFE)

Figure 9A:
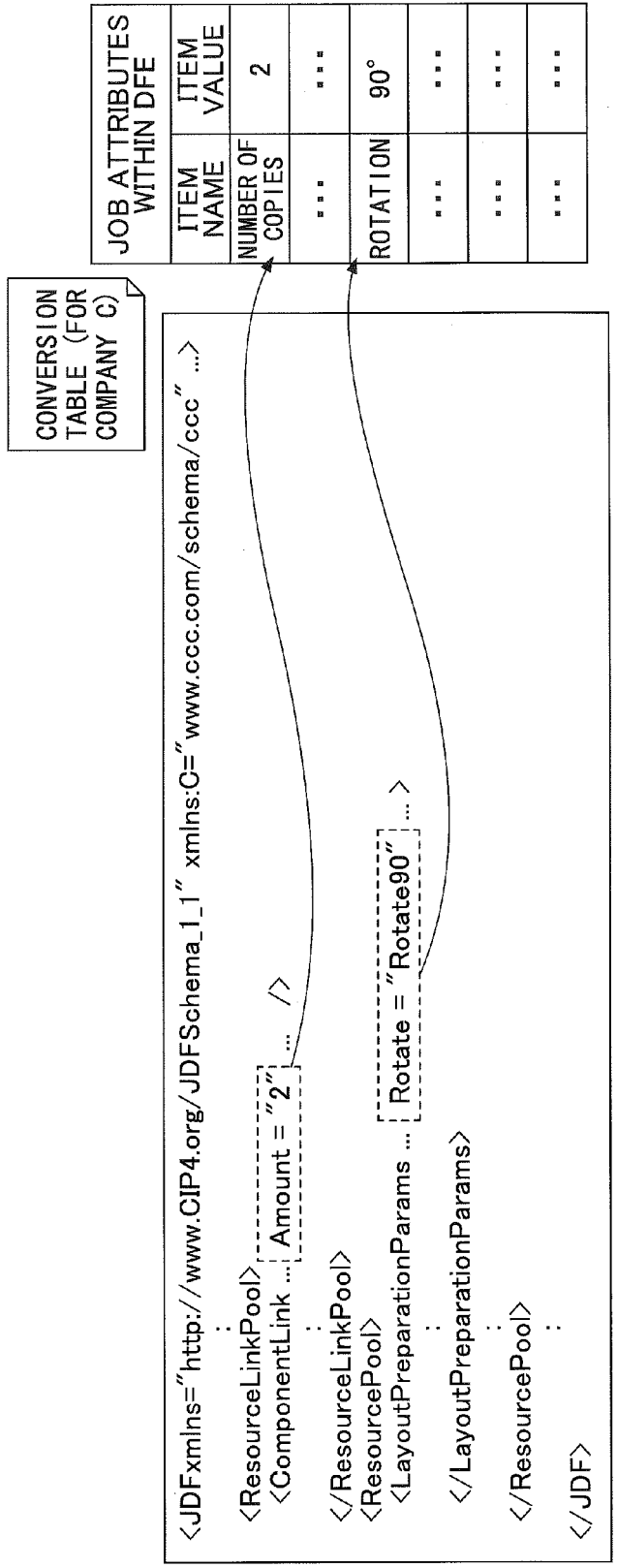
FIG. 9A is an example of a diagram illustrating creation of "job attributes within DFE"
Figure 9B:
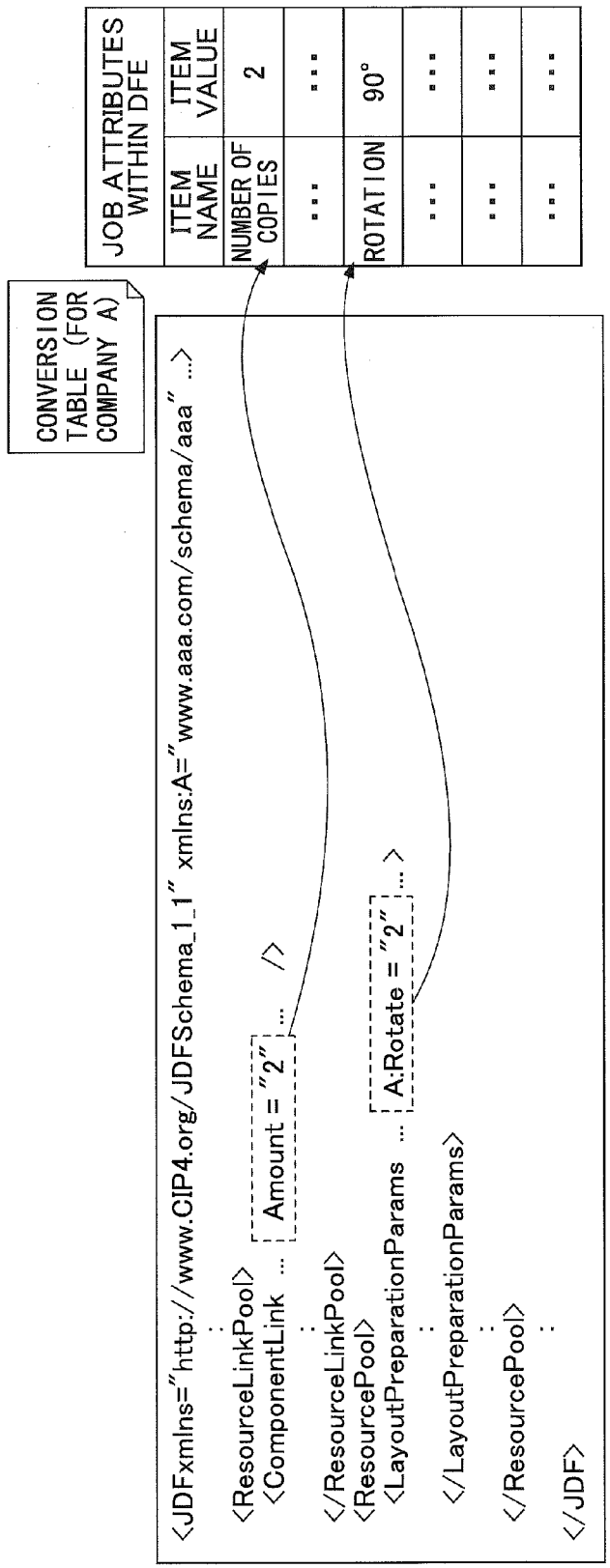
FIG. 9B is an example of a diagram illustrating creation of "job attributes within DFE"
Figure 9C:
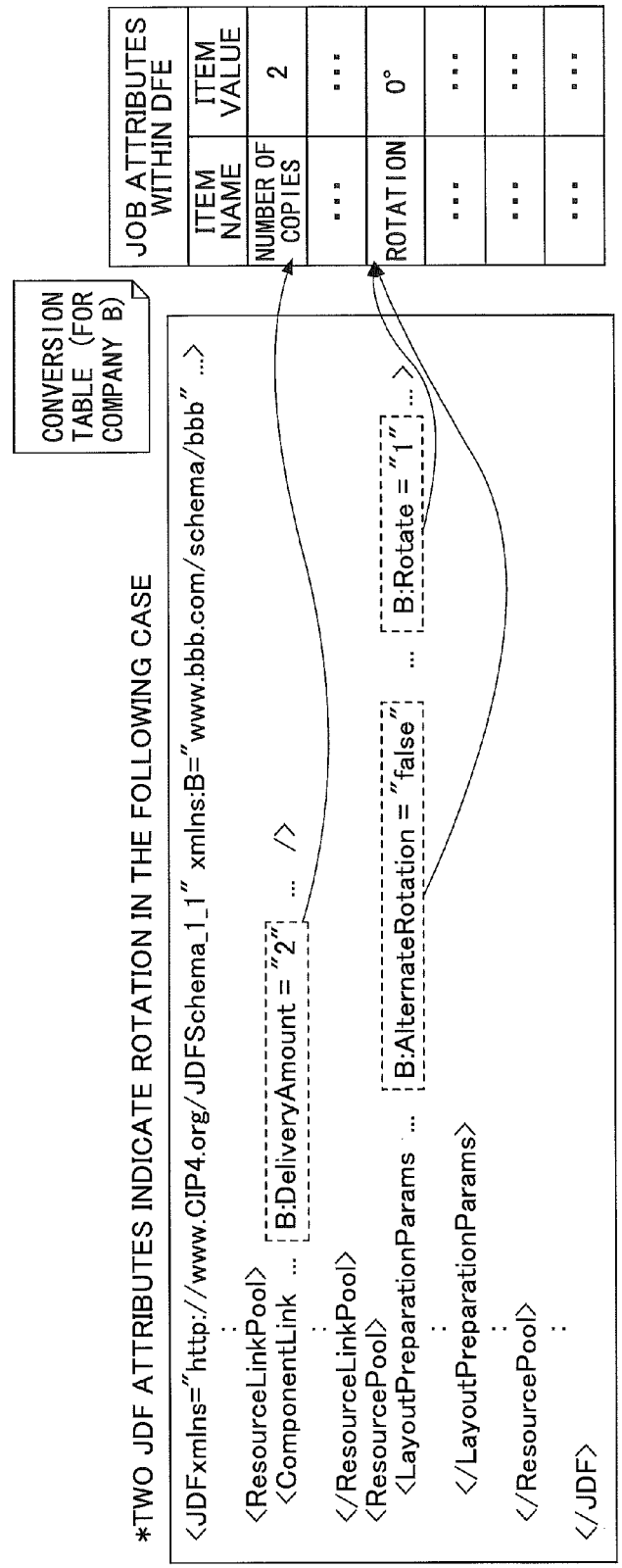
FIG. 9C is an example of a diagram illustrating creation of "job attributes within DFE"

Creation of "job attributes within DFE" is described with reference to FIGS. 8A-C and 9A-C. FIGS. 8A-C show examples of the conversion table 63. FIGS. 9A-C are examples of a diagram illustrating the creation of "job attributes within DFE". The JDF analyzing portion 56 uses the conversion table 63 for a manufacturer of the application 12 that created a JDF (for an RIP engine assumed to process a print job) in order to convert the JDF into "job attributes within DFE". If it is impossible to identify the manufacturer of the application 12 that created the JDF, the JDF is converted into "job attributes within DFE" using all the conversion tables 63. Accordingly, "job attributes within DFE" for all the RIP engines are created.

FIG. 8A shows an example of a conversion table 63 for company C. The conversion table 63 for company C associates an attribute value of an attribute name "Amount" with an item value of an item name "the number of copies" and associates an attribute value of an attribute name "Rotate" with an item value of an item name "rotation".

Conversion is performed, as shown in FIGS. 9A-C, by referring to the conversion table 63 that associates an attribute within a tag of the JDF with an item of the "job attributes within DFE" and placing an attribute value of the JDF as an item value of the "job attributes within DFE".

The JDF analyzing portion 56 stores not only the conversion table 63 for company C but also a conversion table 63 for company A and a conversion table 63 for company B in advance. FIG. 8B shows the conversion table 63 for company A and FIG. 8C shows the conversion table 63 for company B. The JDF analyzing portion 56 detects a description that specifies an extended tag from a JDF, identifies a manufacturer of the application 12, and uses the conversion table 63 for each manufacturer as mentioned above.

It is possible to convert a JDF of company A or B in the same manner. The conversion table 63 for company A associates an attribute value of an attribute name "A:Amount" with an item value of an item name "the number of copies" and associates an attribute value of an attribute name "A:Rotate" with an item value of an item name "rotation". The conversion table 63 for company B associates an attribute value of an attribute name "B:DeliveryAmount" with an item value of an item name "the number of copies" and associates an attribute value of an attribute name "B:Rotate" with an item value of an item name "rotation". In the conversion table 63 for company B, rotation is enabled only if an attribute value of an attribute name "B:AlternateRotation" is "false". If the JDF is determined to be in the company A or B form, it is possible to create "job attributes within DFE" in the same manner as in a JDF in the company C form.

If the JDF analyzing portion 56 determines that a form of a print job in aggregate printing is created by the application 12 of a company different from its own company (company C), the JDF analyzing portion 56 sets "Sheet Mode" in an item "RIP control mode" of the "job attributes within DFE". If the application 12 is made by its own company or the form of a print job in aggregate printing is created by an application 12 of the same company (company C), the JDF analyzing portion 56 sets "Page Mode" in the item "RIP control mode". Accordingly, the RIP controlling portion 58 can control an RIP command to be output to the RIP engine 59 in accordance with the "RIP control mode".

FIG. 10 is a diagram showing an example of "job attributes within DFE". The "job attributes within DFE" is substantially divided into "Job information" related to performing a job, "Edit information" related to raster data, and "Finishing information" related to a finishing process.

In the Job information, an item "number of copies" specifies a number of copies.

In the Edit information, an item "direction information" specifies a direction of printing.

In the Edit information, an item "printing surface information" specifies a printing surface.

In the Edit information, an item "rotation" specifies a rotation angle of a page.

In the Edit information, an item "scaling up/down" specifies scaling and magnification.

In the Edit information, an item "image position: offset" specifies an offset of an image.

In the Edit information, an item "image position: positional adjustment information" specifies positional adjustment of an image.

In the Edit information, an item "layout information: custom imposition arrangement" specifies arrangement of a custom surface.

In the Edit information, an item "layout information: page number" specifies a page number of a single sheet.

In the Edit information, an item "layout information: imposition information" specifies information about surface arrangement.

In the Edit information, an item "layout information: page order information" specifies information about order of pages to be printed.

In the Edit information, an item "layout information: creep positional adjustment" specifies information about adjustment of a creep position.

In the Edit information, an item "margin information" specifies information about a margin such as a fit box or a gutter.

In the Edit information, an item "crop mark information: center crop mark information" specifies information about a center crop mark.

In the Edit information, an item "crop mark information: corner crop mark information" specifies information about a corner crop mark.

In the Finishing information, an item "Collate information" specifies information about whether printing is performed page by page or on a document basis if a plurality of copies of a document is to be printed.

In the Finishing information, an item "staple/bind information" specifies information about stapling or binding.

In the Finishing information, an item "punch information" specifies information about punching.

In the Finishing information, an item "folding information" specifies information about folding.

In the Finishing information, an item "trimming information" specifies information about trimming.

In the Finishing information, an item "output tray information" specifies information about an output tray.

In the Finishing information, an item "input tray information" specifies information about an input tray.

In the Finishing information, an item "cover sheet information" specifies information about a cover sheet.

Further, as shown in FIG. 10, the "RIP control mode" is set in the "job attributes within DFE". In the "RIP control mode", "Page Mode" or "Sheet Mode" is set.

(RIP Parameter List)

FIG. 11 is a diagram showing an example of the "RIP Parameter List".

Input/output data type information specifies types of input or output data (for input or output data, not only a PDL but also a text file or image data such as JPEG are specified).

Reading/writing position specifying method information for input/output data specifies a method for specifying an offset (reading/writing position) of input or output data. For example, it is possible to specify the offset at a designated position, a current position, or an endmost position.

Reading/writing position information for input/output data specifies a current processing position for input and output data.

Reading/writing execution mode information for input/output data specifies an execution mode. For example, READ, WRITE, READ WRITE, or the like is specified.

Unit information (dimensions) specifies a unit to be used within the "RIP Parameter List". For example, "mm", "inch", "pel", "point", or the like is specified.

Compression method information for input/output data specifies a method for compressing input and output data. For example, "UNCOMPRESSED", "PACKBITS", or the like is specified.

"RIP control mode" specifies a control mode in aggregate printing. For example, "Page Mode" or "Sheet Mode" is specified.

An input/output image information portion has "information about an output image", "information about an input image", and "information about handling an image".

(Information about an Output Image)

Image format type specifies a type of an output image format. For example, raster or the like is specified.

Image format dimensions specify dimensions of an output image format.

Image format resolution specifies resolution of an output image format.

Image position specifies a position of an output image.

Color separation information specifies color separation. For example, "k", "cmyk", "separation", or the like is specified.

Color plane fit policy information specifies a method for expanding color planes.

Plane shift information specifies an amount of shift of a color plane.

Color bit number of an image format specifies a number of color bits of an output image format.

Image direction information specifies a direction of a page of an output image.

Image formation position information specifies positional information about a crop area.

Image formation size information specifies size information about a crop area.

Image formation method information specifies a policy of cropping.

Color ICC information specifies information about a color ICC profile.

Font substitution information specifies information about a substitute for a font.

Image formation origin information specifies an origin of image formation. For example, "center", "upper right", or the like is specified.

Flat K black information specifies information about flat K black.

Rendering information specifies information about rendering (rasterizing).

(Information About an Input Image)

Image format type specifies a type of an input image format. For example, raster or the like is specified.

Image format dimensions specify dimensions of an input image format.

Image format resolution specifies resolution of an input image format.

Image position specifies a position of an input image.

Input data specifies input data.

Page area information specifies a page number.

Color ICC information specifies information about a color ICC profile.

(Information About Handling an Image)

Scaling offset information specifies an offset of a scaling algorithm. For example, a horizontal offset, a vertical offset, or the like is specified.

Object region information specifies a width and a height of an object region.

Halftone information specifies an offset of halftone. For example, a horizontal offset, a vertical offset, or the like is specified.

Scaling algorithm information specifies a scaling method.

Information about PDL specifies a data area, size information, and a data arrangement method.

Data area specifies information about an area where a PDL is stored. Font information, information about a number of pages, and the like are included in the PDL present in the data area.

Size information specifies a size of the PDL.

Data arrangement method specifies a method for arranging data. For example, little endian, big endian, or the like is specified.

(Specific Example if Print Job of Application of Company D is Input)

The following describes operations of the DFE 32 if a print job created by an application of company D is input to the DFE 32.

FIG. 12 is an example of a diagram showing an attribute and an attribute value supported by an RIP engine 59 of each company. In FIG. 12, an attribute of an image and an attribute of a character font are shown as an example.

Attribute of an Image

There are three types of superposition patterns (superposition patterns AA, BB, and CC) for images. The superposition pattern AA is supported by all the RIP engines 59. By contrast, the superposition pattern BB is supported by the RIP engine of company A and the RIP engine of company B, and the superposition pattern CC is supported by only the RIP engine of company B.

Attribute of a Character Font

There are three types of character fonts (character font A, character font B, and special font M). The special font M is supported by only the RIP engine of company C.

Figure 13:
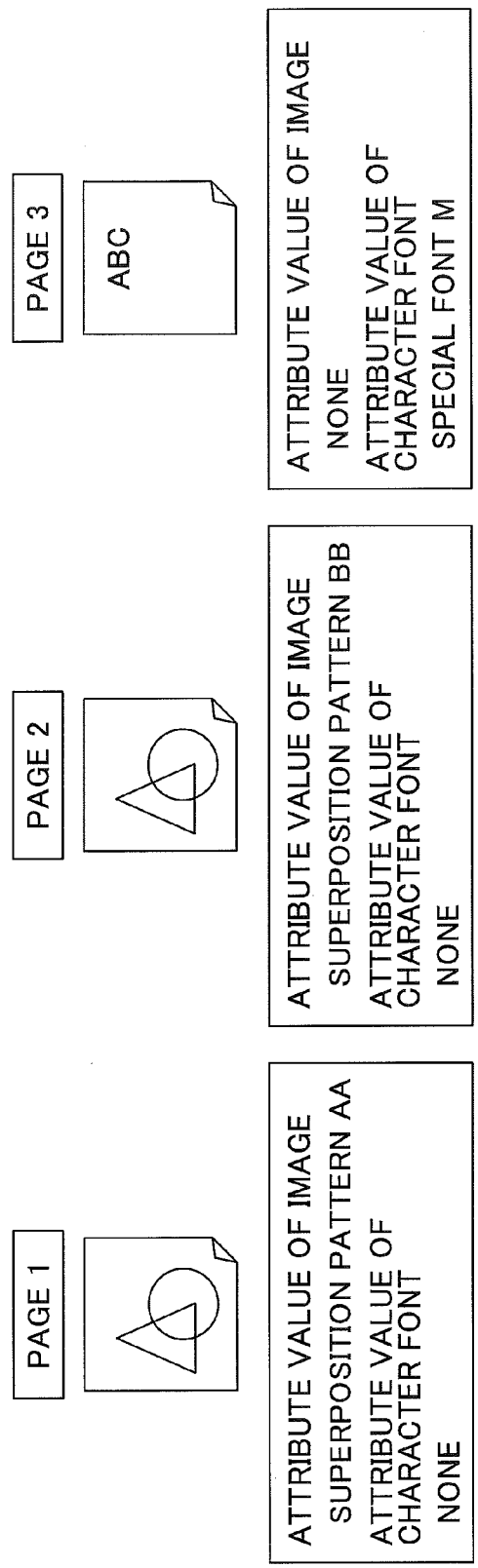
FIG. 13 is an example of a diagram schematically showing an attribute set in a PDL in a print job created by an application of company D.

FIG. 13 is an example of a diagram schematically showing an attribute set in a PDL in a print job created by an application of company D. Page 1 and Page 2 include only images, so that the PDL has only attributes of images. As an attribute value of the attribute of an image, the superposition pattern AA is set on Page 1 and the superposition pattern BB is set on Page 2. The superposition patterns AA and BB are different in transparency of an overlapped area of images. The transparency of the superposition pattern BB is higher than the transparency of the superposition pattern AA.

Page 3 includes only characters, so that the PDL only has attribute values of character fonts. As the attribute value of a character font, the special font M is set on Page 3.

Figure 14:
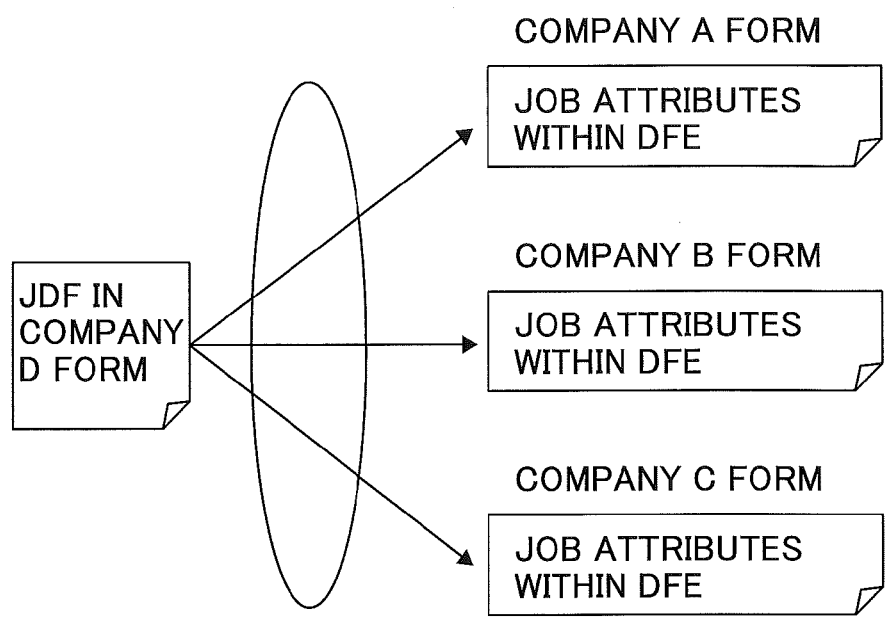
FIG. 14 is an example of a diagram illustrating "job attributes within DFE" created by a JDF analyzing portion.

FIG. 14 is an example of a diagram illustrating "job attributes within DFE" created by the JDF analyzing portion 56. If a JDF of company D is created by an application of company D, the JDF analyzing portion 56 cannot identify company D (even if the JDF analyzing portion 56 can identify company D, the JDF analyzing portion 56 does not have a conversion table 63 for an RIP engine of company D). Accordingly, the JDF analyzing portion 56 creates sets of "job attributes within DFE" using the conversion table 63 for an RIP engine of company A, the conversion table 63 for an RIP engine of company B, and the conversion table 63 for an RIP engine of company C.

Pre-RIP is described with reference to FIGS. 15A and 15B. The job controlling portion 55 outputs a PDL along with a request for checking PDL attributes to the RIP controlling portion 58. The RIP controlling portion 58 outputs a PDL command to each RIP engine and obtains supported attribute values from each RIP engine. The PDL command includes an attribute and the RIP engines return attribute values or a range of the attribute values supported by the RIP engines regarding the attribute. The attribute values or the attribute and the attribute values constitute PDL attribute information.

The PDL command functions as a print instruction for the RIP engine. By the pre-RIP, it is possible to obtain the attribute values or the range of the attribute values (an example of "attribute value information" in the Claims) supported by the RIP engine in response to the print instruction.

Figure 15A:
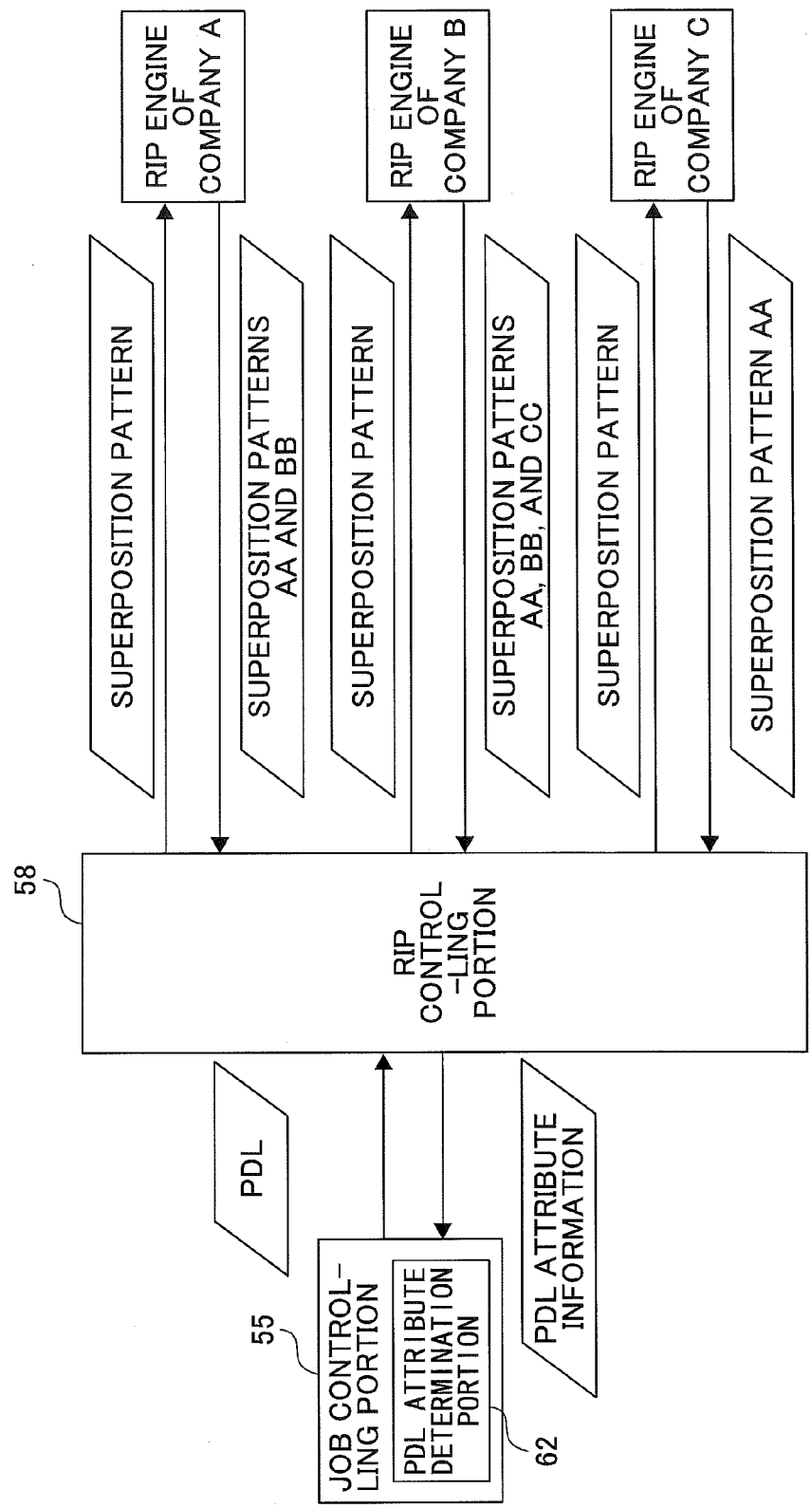
FIG. 15A is an example of a diagram illustrating Pre-RIP.

As shown in FIG. 15A, the RIP engine of company A returns the "superposition patterns AA and BB" as supported attribute values in response to a PDL command "superposition patterns". The RIP engine of company B returns the "superposition patterns AA, BB, and CC" as supported attribute values in response to the PDL command "superposition patterns". The RIP engine of company C returns the "superposition pattern AA" as supported attribute values in response to the PDL command "superposition patterns".

Figure 15B:
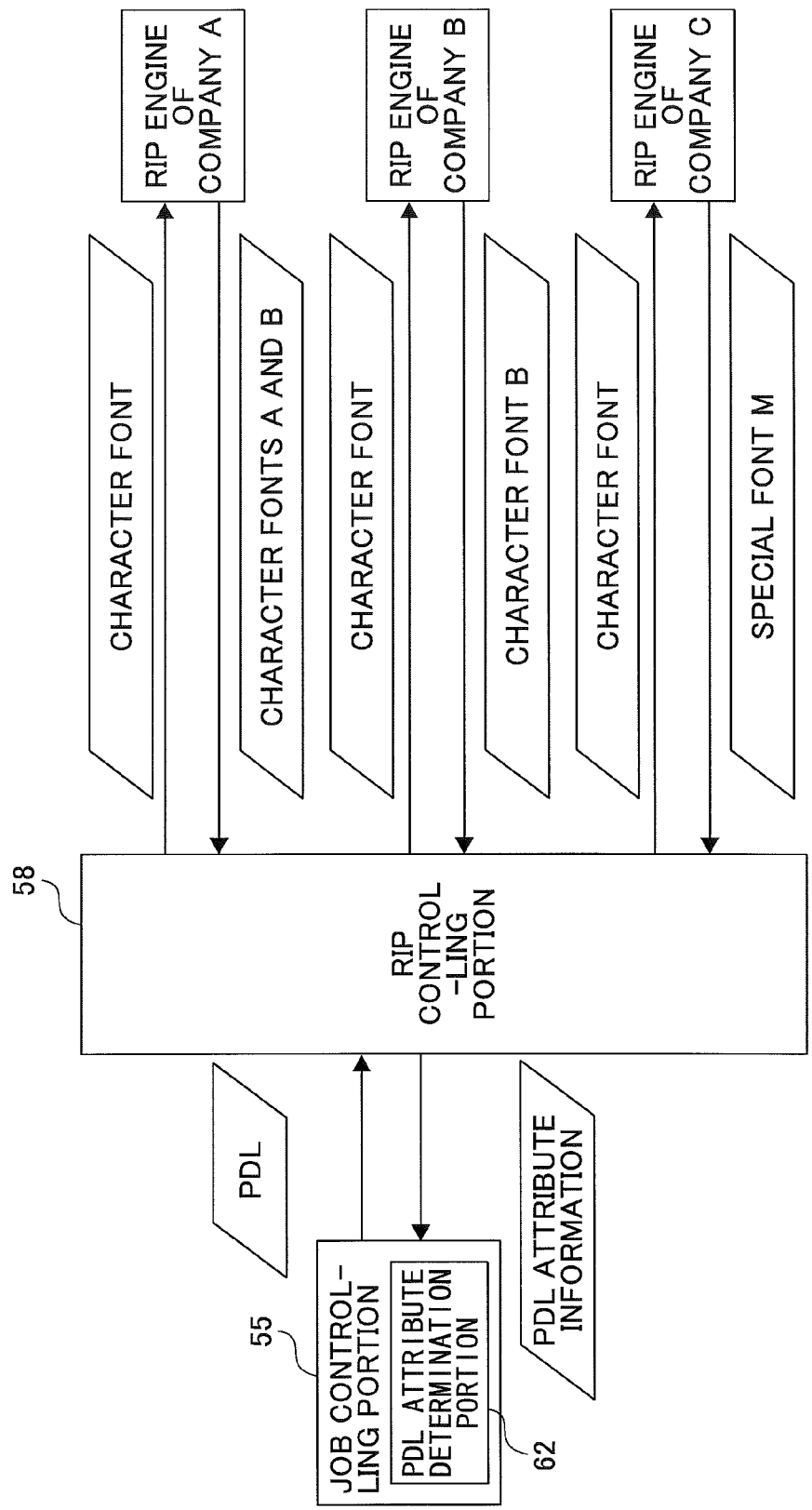
FIG. 15B is an example of a diagram illustrating Pre-RIP.

Further, as shown in FIG. 15B, the RIP engine of company A returns the "character fonts A and B" as supported attribute values in response to a PDL command "character fonts". The RIP engine of company B returns the "character font B" as supported attribute values in response to the PDL command "character fonts". The RIP engine of company C returns the "special font M" as supported attribute values in response to the PDL command "character fonts".

The RIP controlling portion 58 outputs PDL attribute information to the job controlling portion 55. The PDL attribute determination portion 62 of the job controlling portion 55 compares the PDL attribute information obtained in this manner with the PDL and selects an RIP engine 59 on each page.

Figure 16:
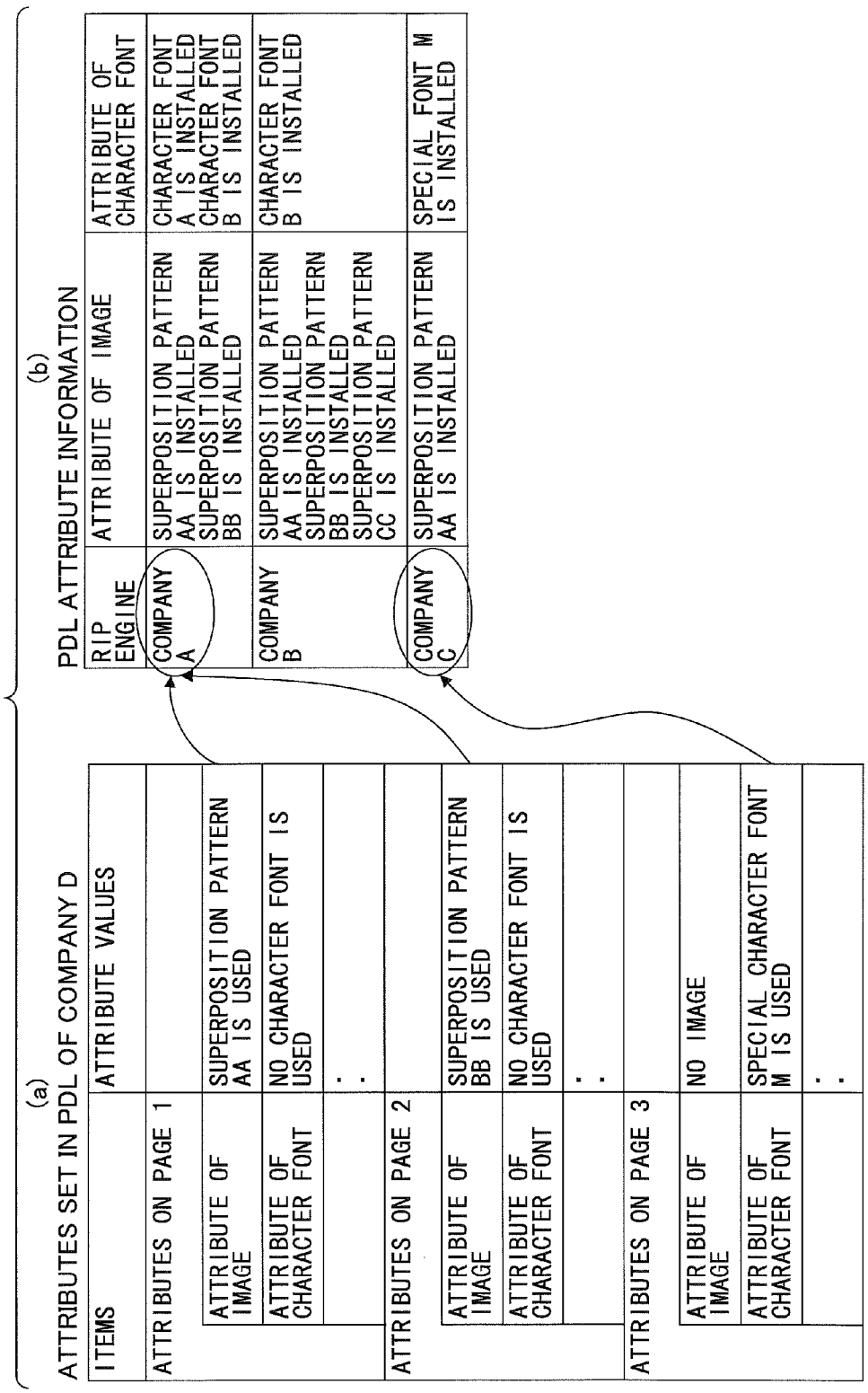
FIG. 16 is an example of a diagram illustrating selection of an RIP engine.

FIG. 16 is an example of a diagram illustrating selection of the RIP engine 59. FIG. 16-(a) shows attributes and attribute values for each page set in a PDL of a print job of company D and FIG. 16-(b) shows an example of PDL attribute information (attributes and attribute values) obtained by the job controlling portion 55.

Page 1

For an attribute of an image on Page 1, an attribute value of the superposed pattern AA for images is set. The PDL attribute determination portion 62 determines that the superposed pattern AA for images is included in PDL attribute information of the RIP engine of company A, the RIP engine of company B, and the RIP engine of company C. If a plurality of RIP engines 59 has PDL attribute information corresponding to a PDL of a print job in this manner, the PDL attribute determination portion 62 selects the RIP engine of company A, for example. A criterion of this selection may be fixed in advance to select an RIP engine having a faster rendering speed, for example, or any RIP engine may be selected.

Page 2

For an attribute of an image on Page 2, an attribute value of the superposed pattern BB for images is set. The PDL attribute determination portion 62 determines that the superposed pattern BB for images is included in the PDL attribute information of the RIP engine of company A and the RIP engine of company B. The PDL attribute determination portion 62 selects the RIP engine of company A or the RIP engine of company B. If the RIP engine selected in a preceding page also supports an attribute in the PDL attribute information on the next page, by selecting the RIP engine 59 selected in the preceding page, a number of switching the RIP engines 59 is reduced and a rendering time can be reduced. Accordingly, the PDL attribute determination portion 62 selects the RIP engine of company A.

Page 3

For an attribute of a character font on Page 3, an attribute value of the special font M is set. The PDL attribute determination portion 62 determines that the special font M is included in the PDL attribute information of the RIP engine of company C. Because only one RIP engine 59 supports the special font M, the PDL attribute determination portion 62 selects the RIP engine of company C.

In addition, when the PDL attribute information is compared with attributes set in the PDL, if there is no RIP engine 59 that is suitable for the attributes set in the PDL, the RIP engine of company A, for example, may be selected in a fixed manner or an error message may be displayed on the UI controlling portion 54 and the process ends without performing rendering.

Figure 17A:
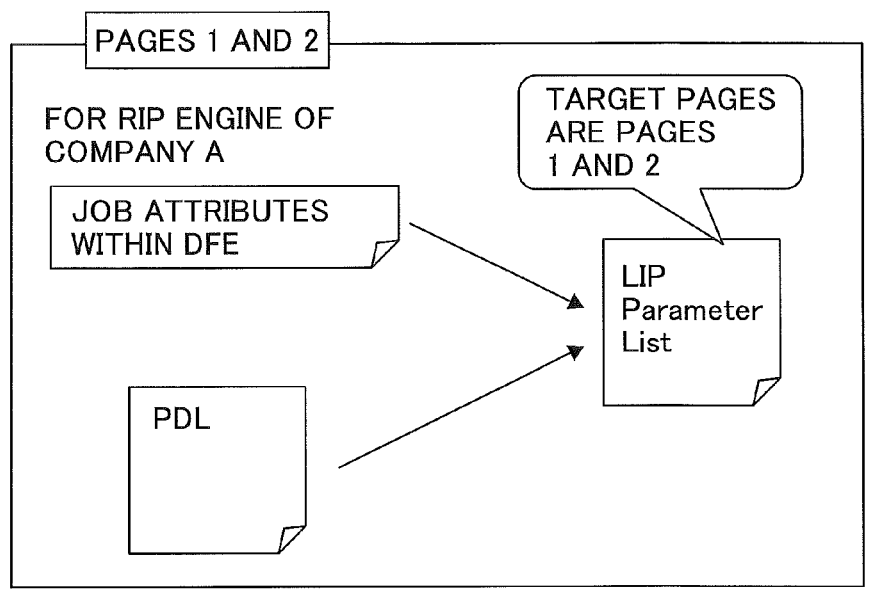
FIG. 17A is an example of a diagram illustrating an "RIP Parameter List" created from "job attributes within DFE"
Figure 17B:
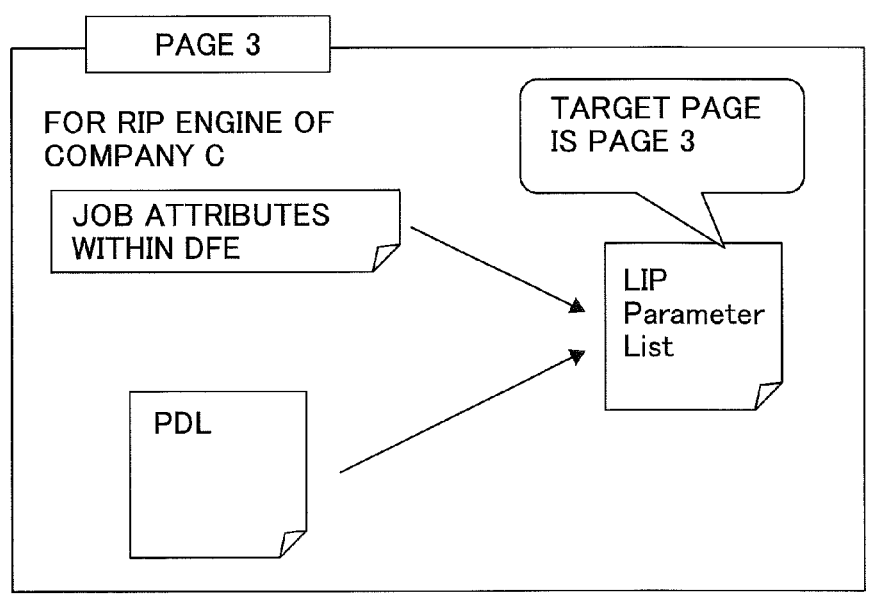
FIG. 17B is an example of a diagram illustrating an "RIP Parameter List" created from "job attributes within DFE"

As shown in FIGS. 17A and 17B, the job controlling portion 55 creates an "RIP Parameter List" on each page using "job attributes within DFE" created by the conversion table 63 for a selected RIP engine and a PDL. FIGS. 17A and 17B are examples of a diagram illustrating the "RIP Parameter List" created from the "job attributes within DFE"

As shown in FIG. 17A, since the RIP engine of company A is selected on Page 1 and Page 2, the job controlling portion 55 creates the "RIP Parameter List" on Page 1 and Page 2 using the "job attributes within DFE" created by the conversion table 63 for the RIP engine of company A and the PDL.

As shown in FIG. 17B, since the RIP engine of company C is selected on Page 3, the job controlling portion 55 creates the "RIP Parameter List" on Page 3 using the "job attributes within DFE" created by the conversion table 63 for the RIP engine of company C and the PDL.

Figure 18:
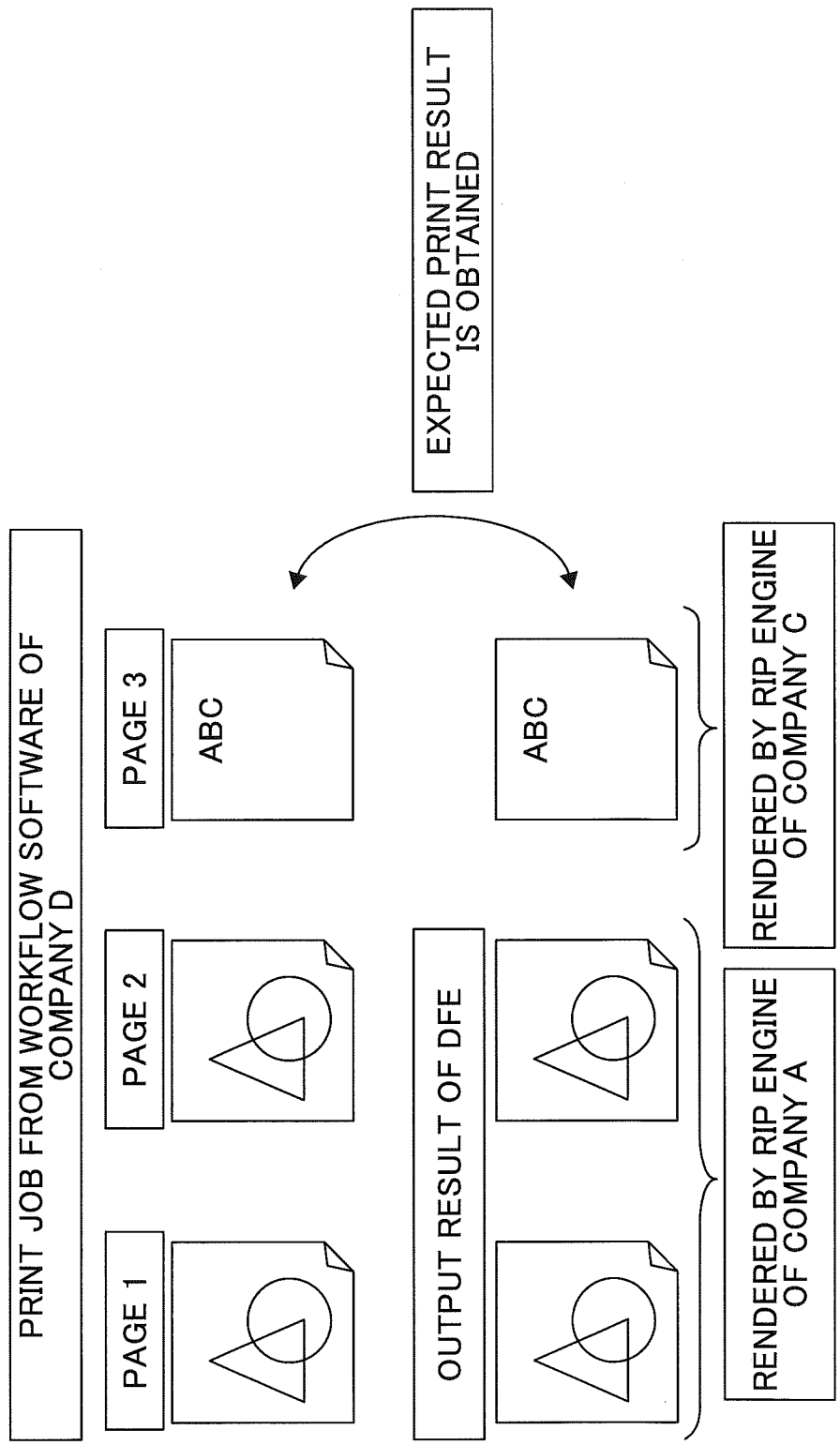
FIG. 18 is an example of a diagram showing an output result of a print job of company D created by a DFE.

FIG. 18 is an example of a diagram showing an output result of a print job of company D created by the DFE 32 of the present embodiment. An upper portion of FIG. 18 shows an output result expected by a user, namely, an output result if the RIP engine of company D performs rendering, for example. A lower portion of FIG. 18 shows an output result by the DFE 32 of the present embodiment.

In the lower portion of FIG. 18, Page 1 and Page 2 are rendered by the RIP engine of company A and both pages have the same output results as expected by the user. Further, Page 3 is rendered by the RIP engine of company C and has the output result as expected by the user because the RIP engine of company C supports the special font M.

By performing pre-RIP in this manner, it is possible to select the RIP engine 59 that supports attributes set in the PDL of a print job created by the application of company D. Accordingly, it is possible to obtain output results as expected by the user.

(Operation Procedure)

Figure 19:
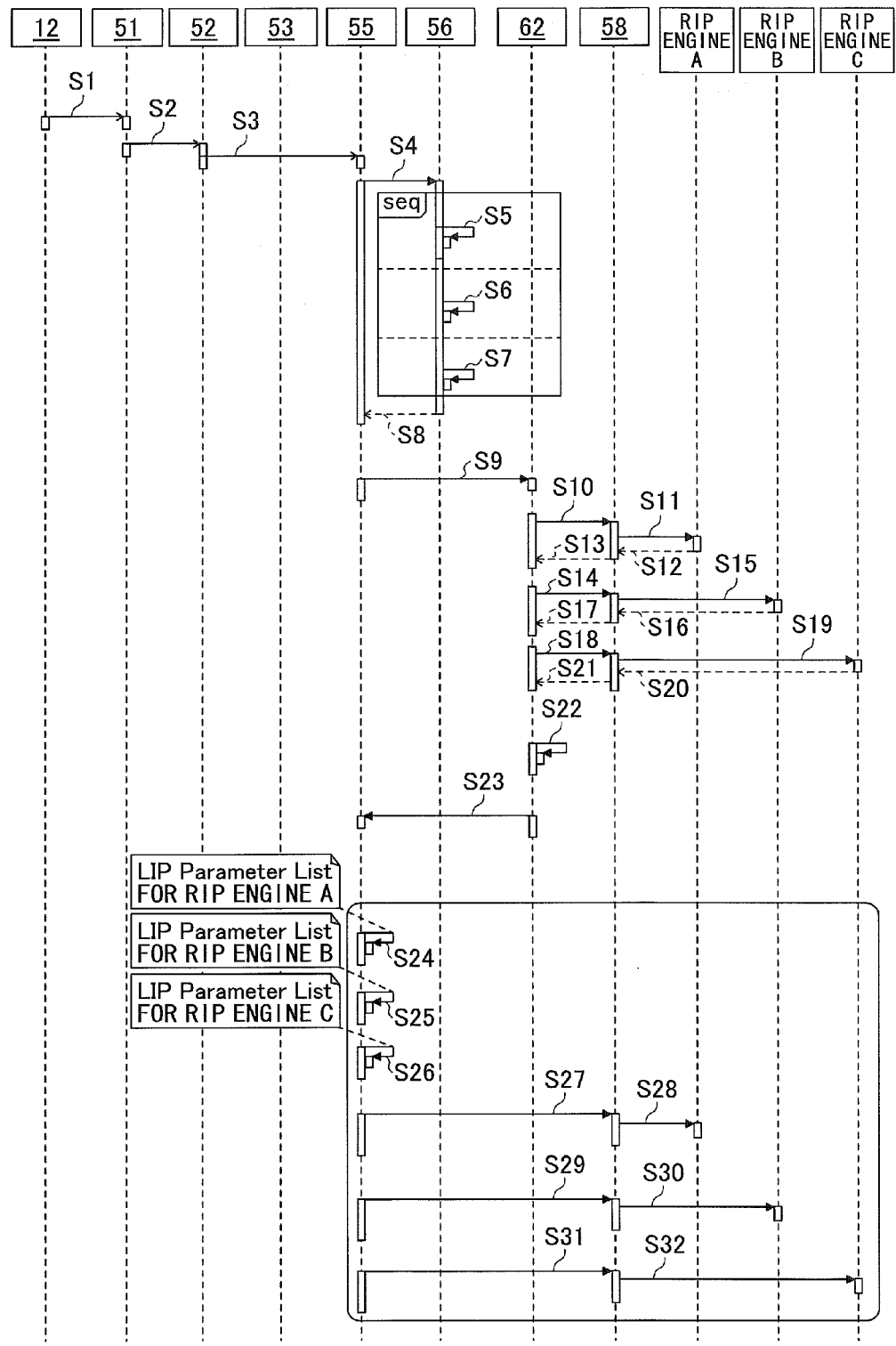
FIG. 19 is an example of a sequence diagram showing a procedure for executing a print job by a DFE.
Figure 20:
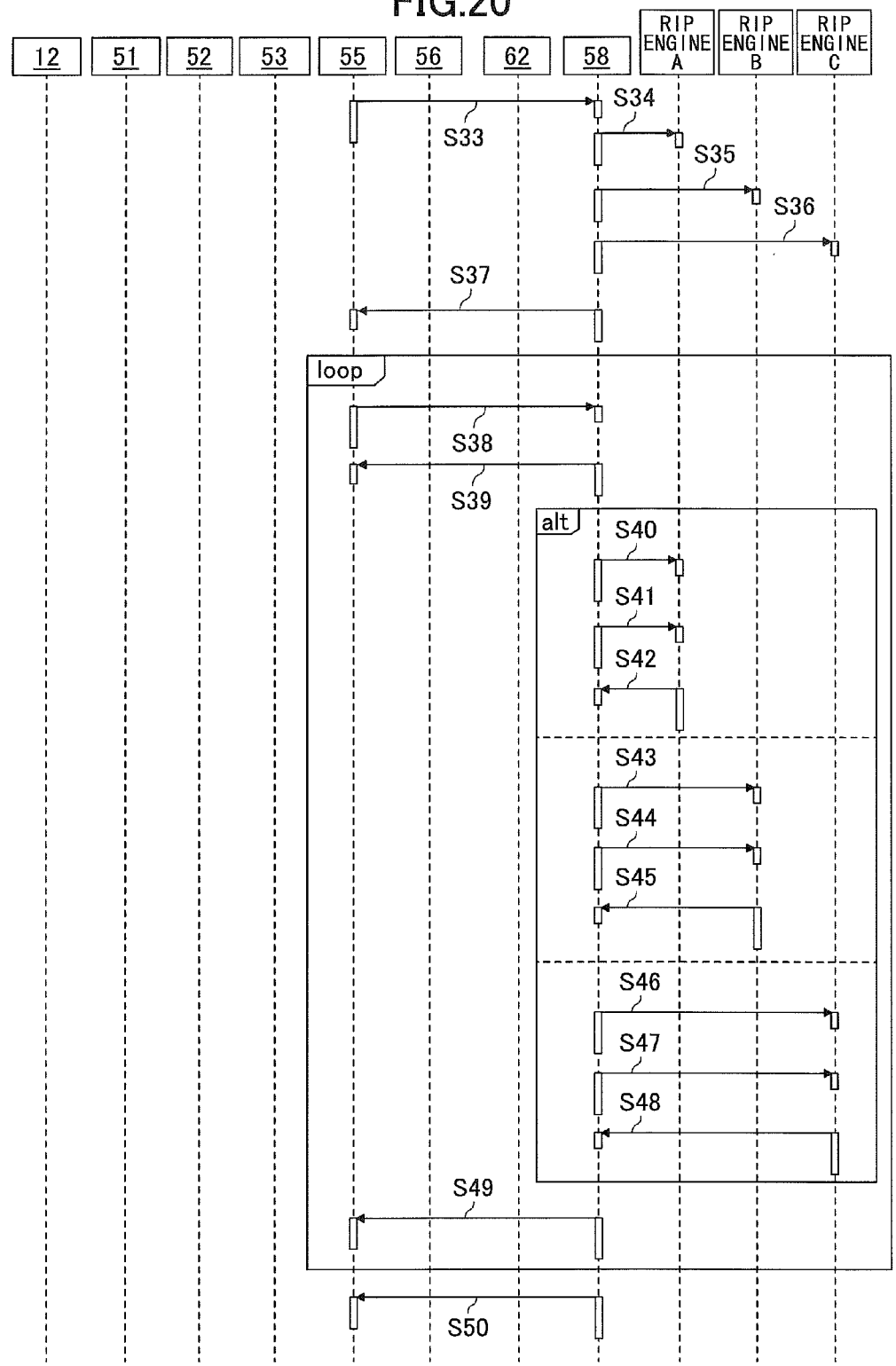
FIG. 20 is an example of a sequence diagram showing a procedure for executing a print job by a DFE.

FIGS. 19 and 20 are examples of a sequence diagram showing a procedure for executing a print job by the DFE 32.

S1: The application 12 transmits a print job (JDF+PDL) to the DFE 32.

S2: The job receiving portion 51 outputs the print job (JDF+PDL) to the system controlling portion 52.

S3: The system controlling portion 52 outputs the print job to the job controlling portion 55. If the DFE 32 is set to store the print job in the job data storing portion 53, the system controlling portion 52 stores the print job in the job data storing portion 53.

S4: The job controlling portion 55 outputs the JDF and a JDF conversion request to the JDF analyzing portion 56.

S5: If the JDF analyzing portion 56 cannot identify an application that created the JDF, the JDF analyzing portion 56 creates "job attributes within DFE" using all the conversion tables 63 prepared for each of RIP engines. Accordingly, the JDF analyzing portion 56 first uses the conversion table 63 for converting a JDF created by an application of company A into "job attributes within DFE" and converts the JDF of company D into "job attributes within DFE".

S6: Next, the JDF analyzing portion 56 uses the conversion table 63 for converting a JDF created by an application of company B into "job attributes within DFE" and converts the JDF of company D into "job attributes within DFE".

S7: Next, the JDF analyzing portion 56 uses the conversion table 63 for converting a JDF created by an application of company C into "job attributes within DFE" and converts the JDF of company D into "job attributes within DFE".

S8: The JDF analyzing portion 56 outputs the three sets of "job attributes within DFE" to the job controlling portion 55.

Next, the job controlling portion 55 performs pre-RIP.

S9: The job controlling portion 55 outputs a PDL attribute check request to the PDL attribute determination portion 62.

S10: The PDL attribute determination portion 62 specifies the RIP engine of company A and outputs a PDL and a pre-RIP request to the RIP controlling portion 58.

S11: The RIP controlling portion 58 performs pre-RIP on the RIP engine of company A. The pre-RIP is performed for each command of the PDL.

S12: The RIP controlling portion 58 obtains PDL attribute information from the RIP engine of company A.

S13: The RIP controlling portion 58 outputs the PDL attribute information to the PDL attribute determination portion 62.

S14: The PDL attribute determination portion 62 specifies the RIP engine of company B and outputs the PDL and a pre-RIP request to the RIP controlling portion 58.

S15: The RIP controlling portion 58 performs pre-RIP on the RIP engine of company B.

S16: The RIP controlling portion 58 obtains PDL attribute information from the RIP engine of company B.

S17: The RIP controlling portion 58 outputs the PDL attribute information to the PDL attribute determination portion 62.

S18: The PDL attribute determination portion 62 specifies the RIP engine of company C and outputs the PDL and a pre-RIP request to the RIP controlling portion 58.

S19: The RIP controlling portion 58 performs pre-RIP on the RIP engine of company C.

S20: The RIP controlling portion 58 obtains PDL attribute information from the RIP engine of company C.

S21: The RIP controlling portion 58 outputs the PDL attribute information to the PDL attribute determination portion 62.

S22: The PDL attribute determination portion 62 compares each set of the obtained PDL attribute information with attribute values set in the PDL of company D to determine whether rendering can be performed by each RIP engine. Further, the PDL attribute determination portion 62 also determines an RIP engine that can perform rendering on each page.

S23: The PDL attribute determination portion 62 outputs a determination result to the job controlling portion 55.

S24: The job controlling portion 55 creates, for a page determined to be rendered by the RIP engine of company A, an "RIP Parameter List" using the PDL and "job attributes within DFE" created by the conversion table 63 for the RIP engine of company A.

S25: The job controlling portion 55 creates, for a page determined to be rendered by the RIP engine of company B, an "RIP Parameter List" using the PDL and "job attributes within DFE" created by the conversion table 63 for the RIP engine of company B.

S26: The job controlling portion 55 creates, for a page determined to be rendered by the RIP engine of company C, an "RIP Parameter List" using the PDL and "job attributes within DFE" created by the conversion table 63 for the RIP engine of company C.

S27: The job controlling portion 55 outputs the "RIP Parameter List" for the RIP engine of company A to the RIP controlling portion 58.

S28: The RIP controlling portion 58 initializes the RIP engine of company A.

S29: The job controlling portion 55 outputs the "RIP Parameter List" for the RIP engine of company B to the RIP controlling portion 58.

S30: The RIP controlling portion 58 initializes the RIP engine of company B.

S31: The job controlling portion 55 outputs the "RIP Parameter List" for the RIP engine of company C to the RIP controlling portion 58.

S32: The RIP controlling portion 58 initializes the RIP engine of company C.

S33: The job controlling portion 55 outputs a job process start request to the RIP controlling portion 58.

S34: The RIP controlling portion 58 outputs an instruction to start a job process to the RIP engine of company A.

S35: The RIP controlling portion 58 outputs an instruction to start a job process to the RIP engine of company B.

S36: The RIP controlling portion 58 outputs an instruction to start a job process to the RIP engine of company C.

S37: The RIP controlling portion 58 outputs a job process response to the job controlling portion 55.

The following process is repeated on each page.

S38: The job controlling portion 55 outputs a page process start request to the RIP controlling portion 58.

S39: The RIP controlling portion 58 outputs a page process response to the job controlling portion 55.

The RIP controlling portion 58 selects the RIP engine 59 based on the "RIP Parameter List" to cause any one of the RIP engine of company A, the RIP engine of company B, and the RIP engine of company C to perform rendering on each page. A sequence by which the RIP controlling portion 58 controls the RIP engine 59 is different depending on the RIP control mode but the difference is omitted in the drawing.

S40: The RIP controlling portion 58 outputs page RIP data (an RIP command on each page) to the RIP engine of company A.

S41: The RIP controlling portion 58 outputs an instruction to start page RIP (an instruction to start rendering) to the RIP engine of company A.

S42: The RIP engine of company A outputs a page RIP completion notice (completion of rendering for the page) to the RIP controlling portion 58.

S43: The RIP controlling portion 58 outputs page RIP data to the RIP engine of company B.

S44: The RIP controlling portion 58 outputs an instruction to start page RIP to the RIP engine of company B.

S45: The RIP engine of company B outputs a page RIP completion notice to the RIP controlling portion 58.

S46: The RIP controlling portion 58 outputs page RIP data to the RIP engine of company C.

S47: The RIP controlling portion 58 outputs an instruction to start page RIP to the RIP engine of company C.

S48: The RIP engine of company C outputs a page RIP completion notice to the RIP controlling portion 58.

S49: When rendering of one page ends, the RIP controlling portion 58 outputs a page process completion notice to the job controlling portion 55.

S50: When rendering of all the pages ends, the RIP controlling portion 58 outputs a job process completion notice to the job controlling portion 55.

As described above, by the pre-RIP, the DFE 32 of the present embodiment is capable of selecting the RIP engine 59 that supports an attribute set in a PDL of a print job created by an application of company D, so that it is possible to obtain an output result expected by a user.

Embodiment 2

In Embodiment 1, the RIP engine 59 is selected on each page and rendering is performed. By the DFE 32 of Embodiment 2, if there is a plurality of pages to be rendered by the same RIP engine 59, the RIP engine 59 continuously performs rendering.

In the present embodiment, for constituent elements provided with the same reference numerals as in Embodiment 1, because these constituent elements will fulfill the same functions, a description of such constituent elements described above may be omitted or only a difference may be described.

Figure 21:
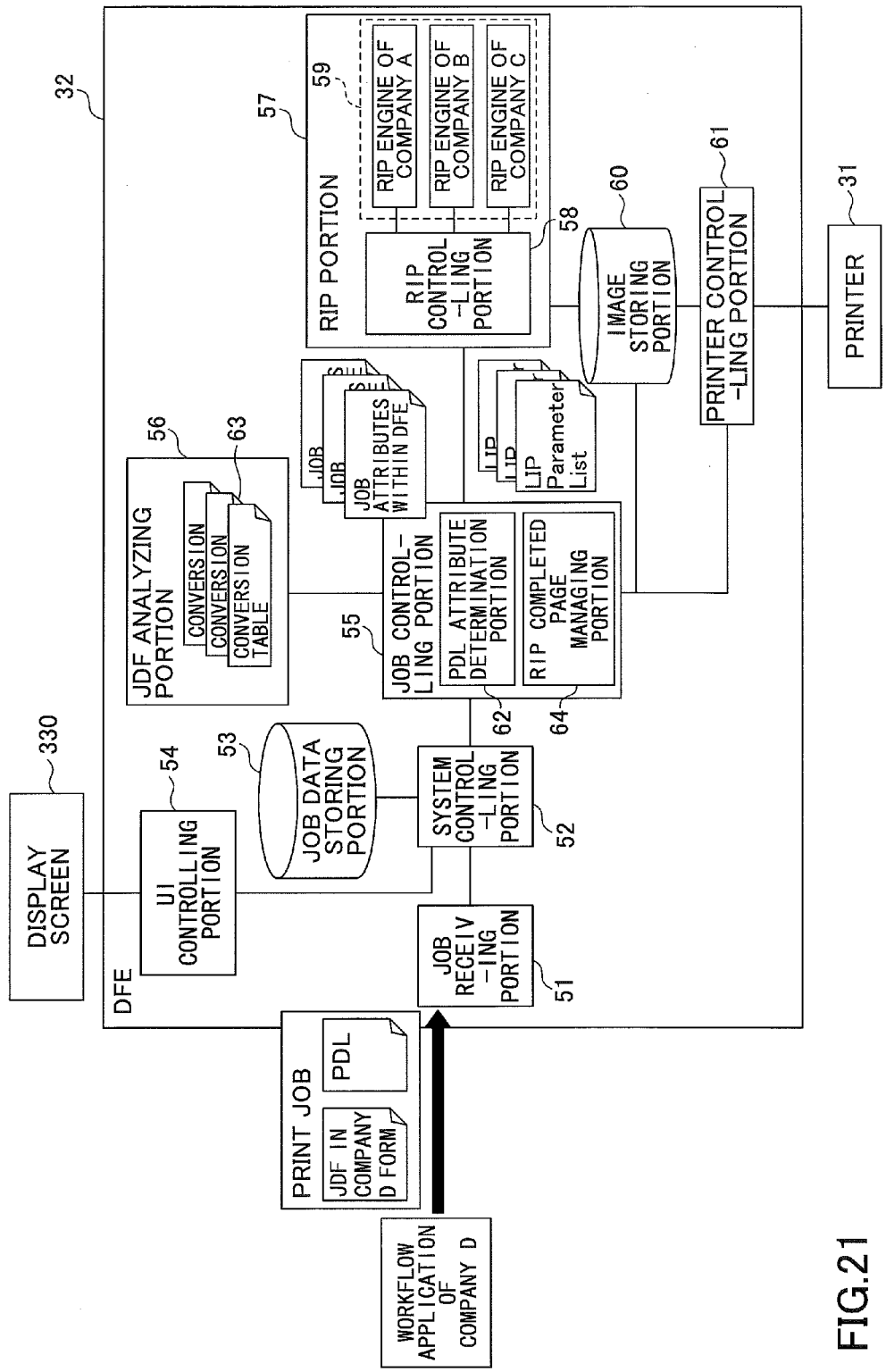
FIG. 21 is an example of a functional block diagram of a DFE (embodiment 2)

FIG. 21 is an example of a functional block diagram of the DFE 32 of the present embodiment. In the DFE 32 of the present embodiment, the job controlling portion 55 includes an RIP completed page managing portion 64. The RIP completed page managing portion 64 changes order of pages such that the same RIP engine 59 can continuously perform rendering. Further, after the rendering is completed, the RIP completed page managing portion 64 arranges pages in the original order. Accordingly, it is possible to perform rendering more efficiently than Embodiment 1 where the RIP engines 59 may be switched on each page.

Figure 22:
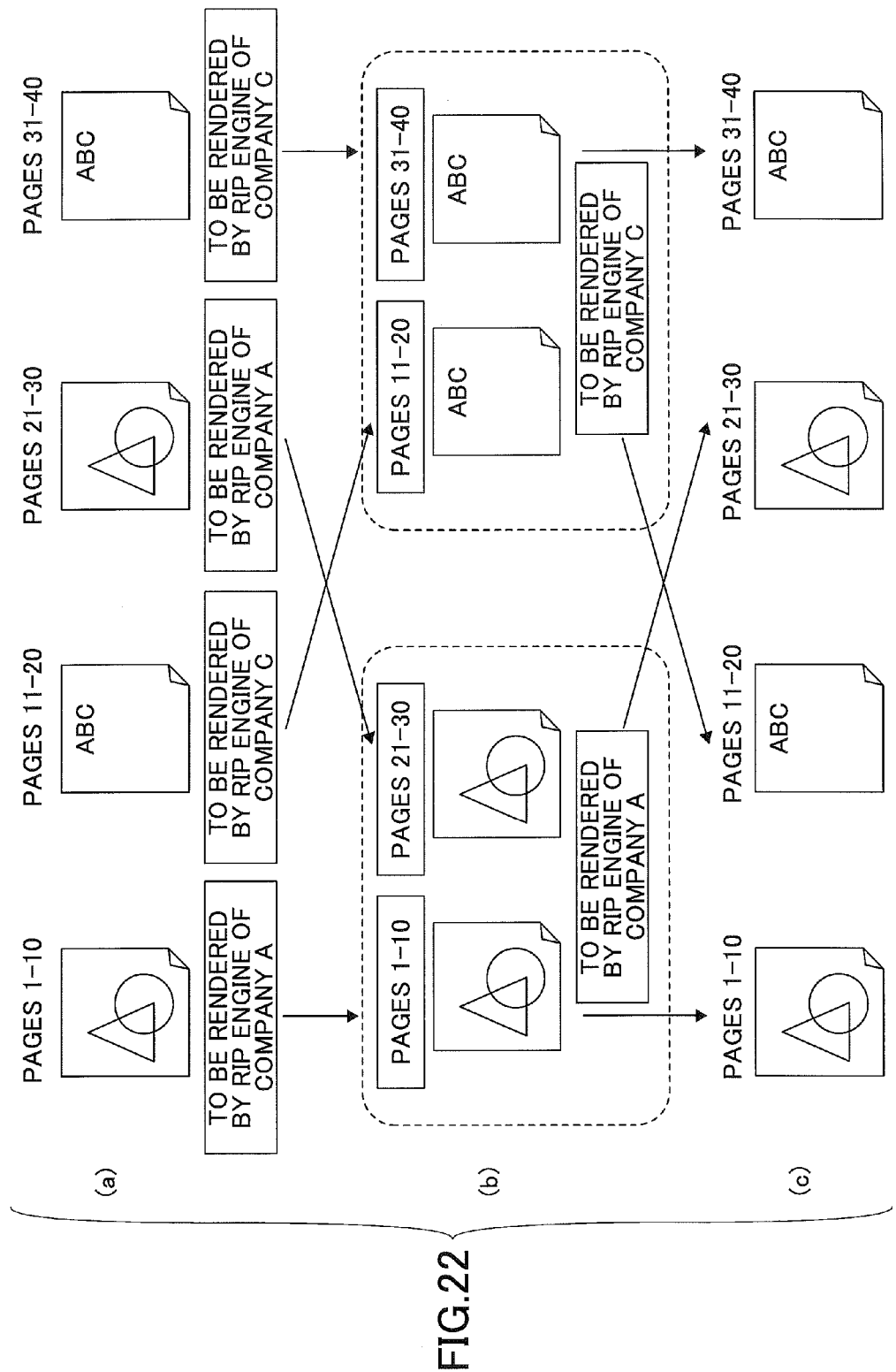
FIG. 22 is an example of a diagram showing correspondence between pages and RIP engines used for rendering.

FIG. 22 is an example of a diagram showing correspondence between pages and RIP engines used for rendering. As shown in FIG. 22-(a), a print job has image pages and text pages in a mixed manner. It is assumed that the image pages are determined to be rendered by the RIP engine of company A and the text pages are determined to be rendered by the RIP engine of company C in the same manner as in Embodiment 1.

Pages 1-10: RIP engine of company A
Pages 11-20: RIP engine of company C
Pages 21-30: RIP engine of company A
Pages 31-40: RIP engine of company C Accordingly, if the job controlling portion 55 does not change the order of pages and sends an instruction to perform rendering to the RIP controlling portion 58, the RIP engines 59 will be switched on pages 11, 21, and 31 resulting in three times in total.

As shown in FIG. 22-(b), the RIP completed page managing portion 64 changes the order of pages such that the same RIP engine 59 is used continuously.

Pages 1-10, 21-30: RIP engine of company A
Pages 11-20, 31-40: RIP engine of company C In accordance with this, since the RIP engines 59 are switched only once, an amount of time that may be generated by switching (an amount of time when no rendering is performed) is reduced and rendering will be efficiently performed.

Further, if the changed order of pages is maintained, the order of pages in the print job and the order of pages in a rendering result will be different. Accordingly, as shown in FIG. 22-(c), the RIP completed page managing portion 64 arranges pages in the original order, so that the printer 31 can perform printing in the original order of pages.

Figure 23:
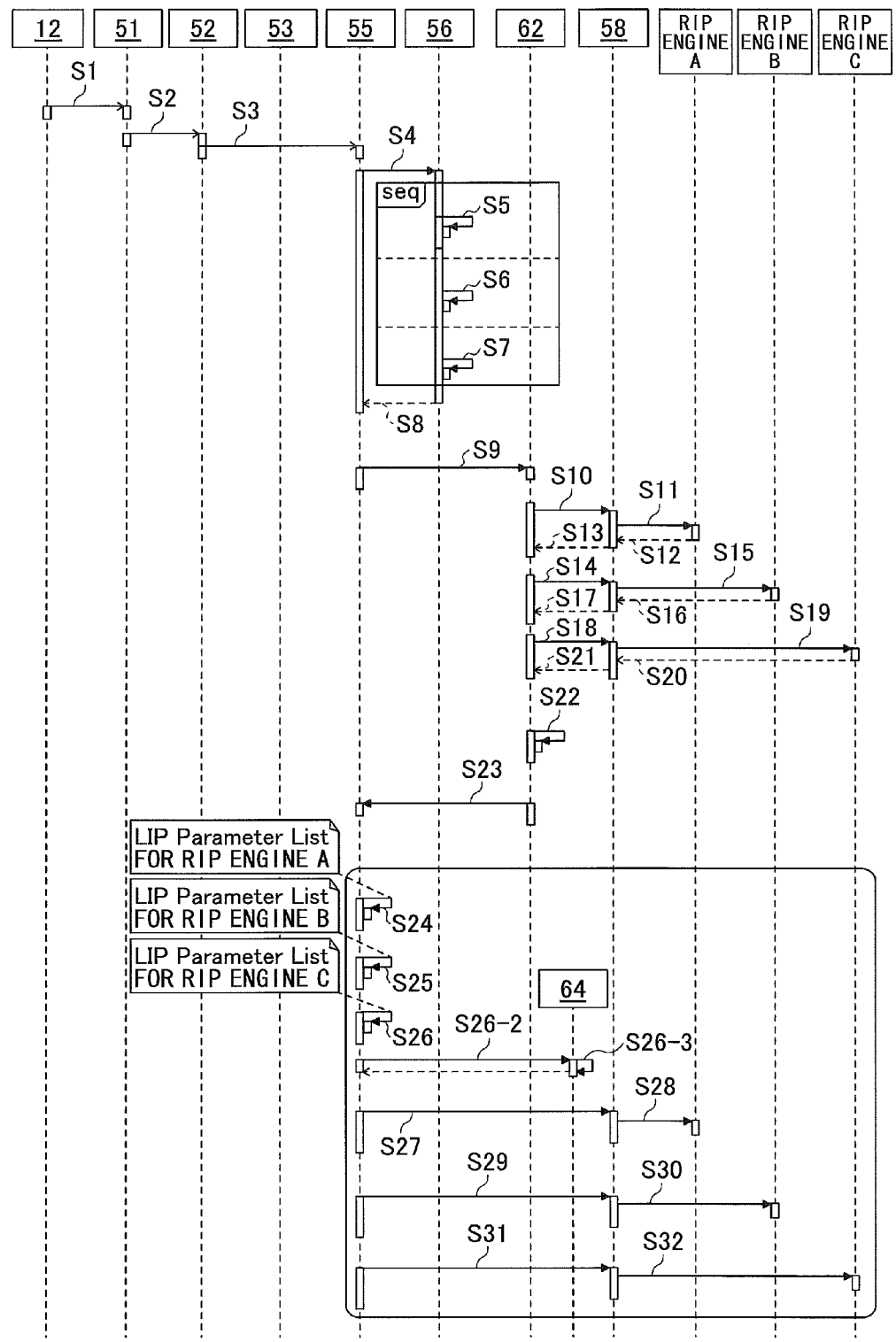
FIG. 23 is an example of a sequence diagram showing a procedure for executing a print job by a DFE.
Figure 24:
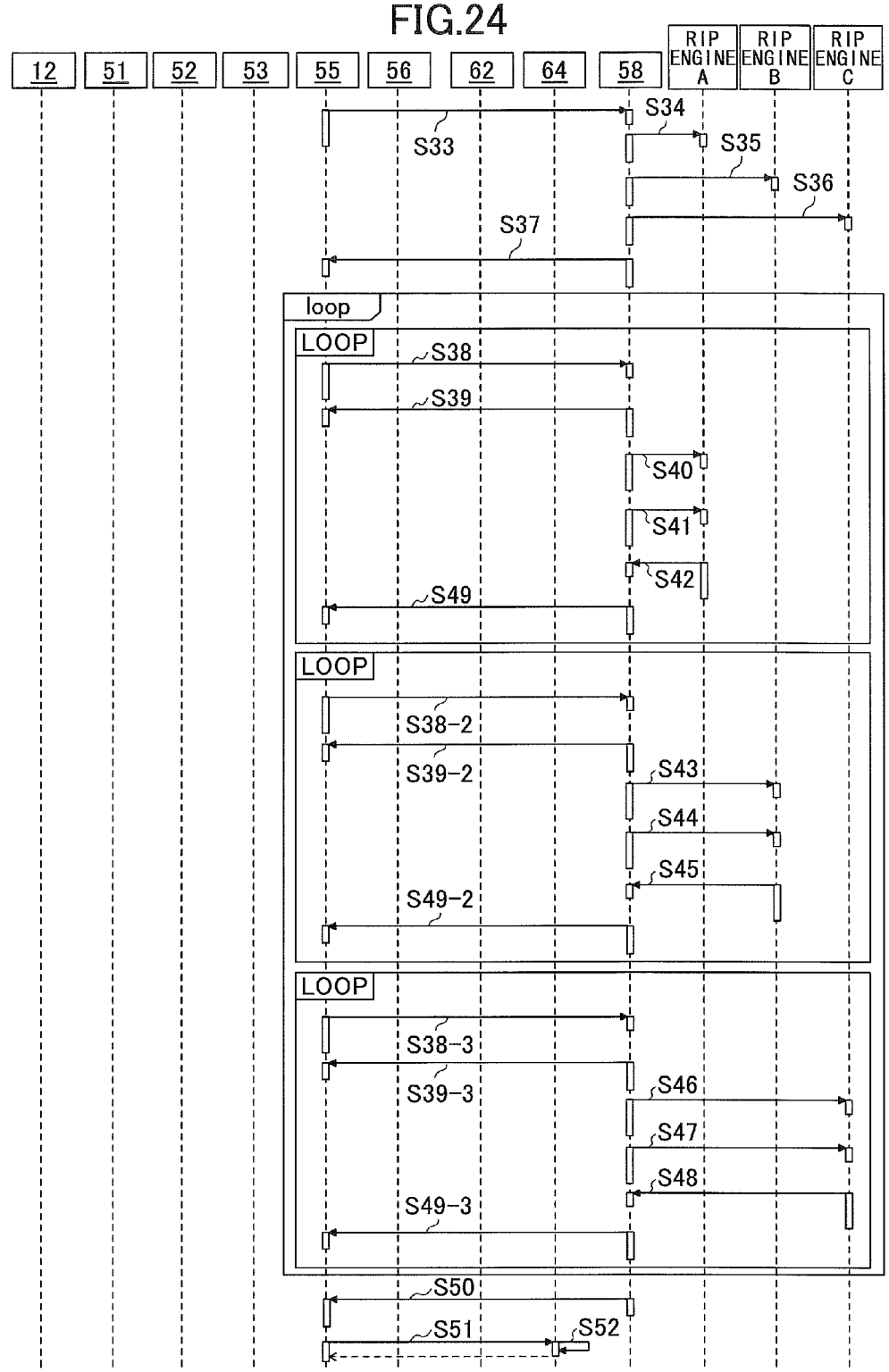
FIG. 24 is an example of a sequence diagram showing a procedure for executing a print job by a DFE.

FIGS. 23 and 24 are examples of a sequence diagram showing a procedure for executing a print job by the DFE 32. In FIGS. 23 and 24, a difference with respect to FIGS. 19 and 20 are mainly described.

S26-2: When the "RIP Parameter List" is created for each RIP engine, the job controlling portion 55 causes the RIP completed page managing portion 64 to change the order of pages.

S26-3: The RIP completed page managing portion 64 changes the order of pages such that pages to be processed by the same RIP engine 59 are successive. The page numbers and the "RIP Parameter List" are associated by the job controlling portion 55. Then, the "RIP Parameter List" for each RIP engine is output to the RIP controlling portion 58.

When the process proceeds to step S38, rendering is performed for each page in the same manner as in Embodiment 1. In the present embodiment, however, pages to be rendered by the same RIP engine 59 are successively rendered.

S38 to S49: First, the RIP engine 59 of company A continuously renders those pages to be rendered by the RIP engine of company A. Since the order of pages in the "RIP Parameter List" is already changed, when the RIP controlling portion 58 selects the RIP engine 59 of company A based on the "RIP Parameter List", the RIP controlling portion 58 can cause the RIP engine 59 of company A to continuously perform rendering.

S38-2 to S49-2: When the rendering by the RIP engine 59 of company A ends, the RIP engine 59 of company B continuously renders those pages to be rendered by the RIP engine 59 of company B. When the RIP controlling portion 58 selects the RIP engine 59 of company B based on the "RIP Parameter List", the RIP controlling portion 58 can cause the RIP engine 59 of company B to continuously perform rendering in the same manner.

S38-3 to S49-3: When the rendering by the RIP engine 59 of company B ends, the RIP engine 59 of company C continuously renders those pages to be rendered by the RIP engine 59 of company C. When the RIP controlling portion 58 selects the RIP engine 59 of company C based on the "RIP Parameter List", the RIP controlling portion 58 can cause the RIP engine 59 of company C to continuously perform rendering in the same manner.

S51: When the RIP controlling portion 58 outputs a job process completion notice to the job controlling portion 55, the job controlling portion 55 causes the RIP completed page managing portion 64 to arrange pages in the original order.

S52: The RIP completed page managing portion 64 arranges the pages stored in the image storing portion 60 in the original order.

In this manner, by the DFE 32 of the present embodiment, the same RIP engine 59 continuously performs rendering, so that efficient rendering is possible while frequency of switching the RIP engines 59 is reduced.

(Preferable Modification)

While the best mode for implementing the present invention has been described based on the embodiments above, the present invention is not limited to these embodiments at all but various types of modifications or replacements can be added without departing from the points of the present invention.

For example, while the DFE 32 in FIG. 6 has all the functions described in the embodiments, each of these functions may be disposed on separate devices capable of communication via a network. For example, the RIP engine 59 of each company and the JDF analyzing portion 56 may be present on a network accessible to the DFE 32. Further, the PDL attribute determination portion 62 and the RIP completed page managing portion 64 may be present on a network accessible to the DFE 32.

The image storing portion 60 and the job data storing portion 53 may also be present on a network accessible to the DFE 32.

Further, the present invention is not limited to these embodiments, and various variations and modifications may be made without departing from the scope of the present invention.

The present application is based on and claims the benefit of priority of Japanese Priority Patent Application No. 2014-051845 filed on Mar. 14, 2014 and Japanese Priority Patent Application No. 2015-035825 filed on Feb. 25, 2015 the entire contents of which are hereby incorporated by reference.

What is claimed is:

1. An information processing apparatus for generating drawing data by using a print job including setting information and print data, the information processing apparatus comprising:
   a plurality of drawing data generation units that generate drawing data, each drawing data generation unit associated with a different source application for creating print jobs, and each drawing data generation unit supporting a different set of attributes to render; and
   a controller that analyzes the setting information of the print job to identify a source application of the print job;
   in response to a determination that the source application of the print job is associated with one of the drawing data generation units, the controller selects the one of the drawing data generation units for rendering the print job; and
   in response to a determination that the source application of the print job is not associated with any of the drawing data generation units, the controller compares the print data of the print job with the different set of attributes of the drawing data generation units for each page in the print job, and selects a drawing data generation unit for a page of the print job based on the comparison.

2. The information processing apparatus as claimed in claim 1, wherein, in response of the determination that the source application of the print job is not associated with any of the drawing data generation units, the controller sends an inquiry to each of the drawing data generation units based on the print data for pages of the print job, obtains the different sets of the attributes, and performs the comparison to select drawing data generation units page by page for the print job.

3. The information processing apparatus as claimed in claim 2, wherein:
   the print data comprises Page Description Language (PDL) data and the controller generates the inquiry using a PDL command.

4. The information processing apparatus as claimed in claim 1, further comprising:
   a page order changing unit that changes an order of rendering pages such that a same drawing data generation unit generates drawing data for successive pages.

5. The information processing apparatus as claimed in claim 4, wherein the page order changing unit arranges pages of the drawing data generated by the drawing data generation unit in original order.

6. The information processing apparatus as claimed in claim 1, wherein:
   the setting information comprises a Job Definition Format (JDF) job ticket and the controller detects a description that specifies an extended tag in the JDF job ticket to identify the source application of the print job.

7. An information processing method comprising:
   outputting a print job including setting information and print data to one or more of a plurality of drawing data generation units that generate drawing data, each drawing data generation unit associated with a different source application for creating print jobs, and each drawing data generation unit supporting a different set of attributes to render;
   analyzing the setting information of the print job to identify a source application of the print job;
   in response to determining that the source application of the print job is associated with one of the drawing data generation units, selecting the one of the drawing data generation units for rendering the print job; and
   in response to a determining that the source application of the print job is not associated with any of the drawing data generation units:
      comparing the print data of the print job with the different set of attributes of the drawing data generation units for each page in the print job; and
      selecting a drawing data generation unit for a page of the print job based on the comparison.

8. A non-transitory computer-readable storage medium storing a computer-readable program that, when executed by a computer, causes an information processing apparatus to perform a process, the process comprising:
   outputting a print job including setting information and print data to one or more of a plurality of drawing data generation units that generate drawing data, each drawing data generation unit associated with a different source application for creating print jobs, and each drawing data generation unit supporting a different set of attributes to render;

analyzing the setting information of the print job to identify a source application of the print job;

in response to determining that the source application of the print job is associated with one of the drawing data generation units, selecting the one of the drawing data generation units for rendering the print job; and in response to a determining that the source application of the print job is not associated with any of the drawing data generation units:
  comparing the print data of the print job with the different set of attributes of the drawing data generation units for each page in the print job; and
  selecting a drawing data generation unit for a page of the print job based on the comparison.

* * * * *